US011221054B2

(12) United States Patent
Nejedly et al.

(10) Patent No.: US 11,221,054 B2
(45) Date of Patent: Jan. 11, 2022

(54) E-CHARGER WITH HYBRID DAMPENING SYSTEM

(71) Applicant: Garrett Transportation I Inc., Torrance, CA (US)

(72) Inventors: Milan Nejedly, Brno (CZ); Vit Houst, Sestajovice (CZ); Daniel Turecek, Ostopovice (CZ); Pavel Krejci, Brno (CZ); Zbynek Oslejsek, Brno (CZ)

(73) Assignee: GARRETT TRANSPORTATION I INC, Torrance, CA (US)

( * ) Notice: Subject to any disclaimer, the term of this patent is extended or adjusted under 35 U.S.C. 154(b) by 114 days.

(21) Appl. No.: 16/696,453

(22) Filed: Nov. 26, 2019

(65) Prior Publication Data
US 2021/0156449 A1 May 27, 2021

(51) Int. Cl.
| | | |
|---|---|---|
| *F16F 15/023* | (2006.01) | |
| *F04D 25/08* | (2006.01) | |
| *F04D 29/66* | (2006.01) | |
| *F16F 9/12* | (2006.01) | |
| *H02K 9/19* | (2006.01) | |
| *F02B 33/40* | (2006.01) | |
| *F02B 39/00* | (2006.01) | |
| *F02B 39/10* | (2006.01) | |

(52) U.S. Cl.
CPC ........ *F16F 15/0235* (2013.01); *F04D 25/082* (2013.01); *F04D 29/668* (2013.01); *F16F 9/12* (2013.01); *H02K 9/19* (2013.01); *F02B 33/40* (2013.01); *F02B 39/005* (2013.01); *F02B 39/10* (2013.01)

(58) Field of Classification Search
CPC ....... F16F 15/0235; F16F 9/12; F04D 25/082; F04D 29/668; H02K 9/19; F02B 33/40; F02B 39/005; F02B 39/10
See application file for complete search history.

(56) References Cited

U.S. PATENT DOCUMENTS

| | | | |
|---|---|---|---|
| 7,061,147 B2 * | 6/2006 | Ries ........................ | H02K 1/30 310/54 |
| 8,736,119 B2 * | 5/2014 | Iwamoto .................. | H02K 5/20 310/54 |
| 2004/0037716 A1 | 2/2004 | Jaisle | |
| 2014/0090626 A1 | 4/2014 | An et al. | |
| (Continued) | | | |

FOREIGN PATENT DOCUMENTS

| | | | |
|---|---|---|---|
| EP | 2639425 A1 | 9/2013 | |
| EP | 2733359 A1 | 5/2014 | |
| (Continued) | | | |

*Primary Examiner* — Jesse S Bogue
(74) *Attorney, Agent, or Firm* — Lorenz & Kopf LLP

(57) ABSTRACT

An e-charger includes a shaft supported for rotation about an axis. The e-charger also includes a compressor wheel that is attached to the shaft. The e-charger further includes an electric motor configured to drive the shaft and the compressor wheel in rotation. Also, the e-charger includes a housing that houses the electric motor and at least part of the shaft. Moreover, the e-charger includes a dampening system incorporated in the housing and configured to dampen loads transferring through the housing. The dampening system includes at least one solid-state dampener that is resiliently flexible, and the dampening system includes at least one fluid viscous dampener.

19 Claims, 12 Drawing Sheets

(56) References Cited

U.S. PATENT DOCUMENTS

| | | | |
|---|---|---|---|
| 2015/0337850 A1* | 11/2015 | An | F04D 25/024 |
| | | | 60/605.3 |
| 2017/0037858 A1 | 2/2017 | Back et al. | |
| 2018/0306209 A1 | 10/2018 | Nejedly et al. | |
| 2019/0157942 A1 | 5/2019 | Futae et al. | |
| 2019/0226486 A1* | 7/2019 | Iizuka | F02B 39/005 |
| 2019/0345956 A1 | 11/2019 | Iizuka et al. | |
| 2021/0156299 A1* | 5/2021 | Houst | F02B 39/005 |

FOREIGN PATENT DOCUMENTS

| | | |
|---|---|---|
| EP | 2924261 A1 | 9/2015 |
| EP | 3144497 A1 | 3/2017 |
| EP | 3333371 A2 | 6/2018 |
| JP | 2005240978 A | 9/2005 |
| JP | 2005248856 A | 9/2005 |

* cited by examiner

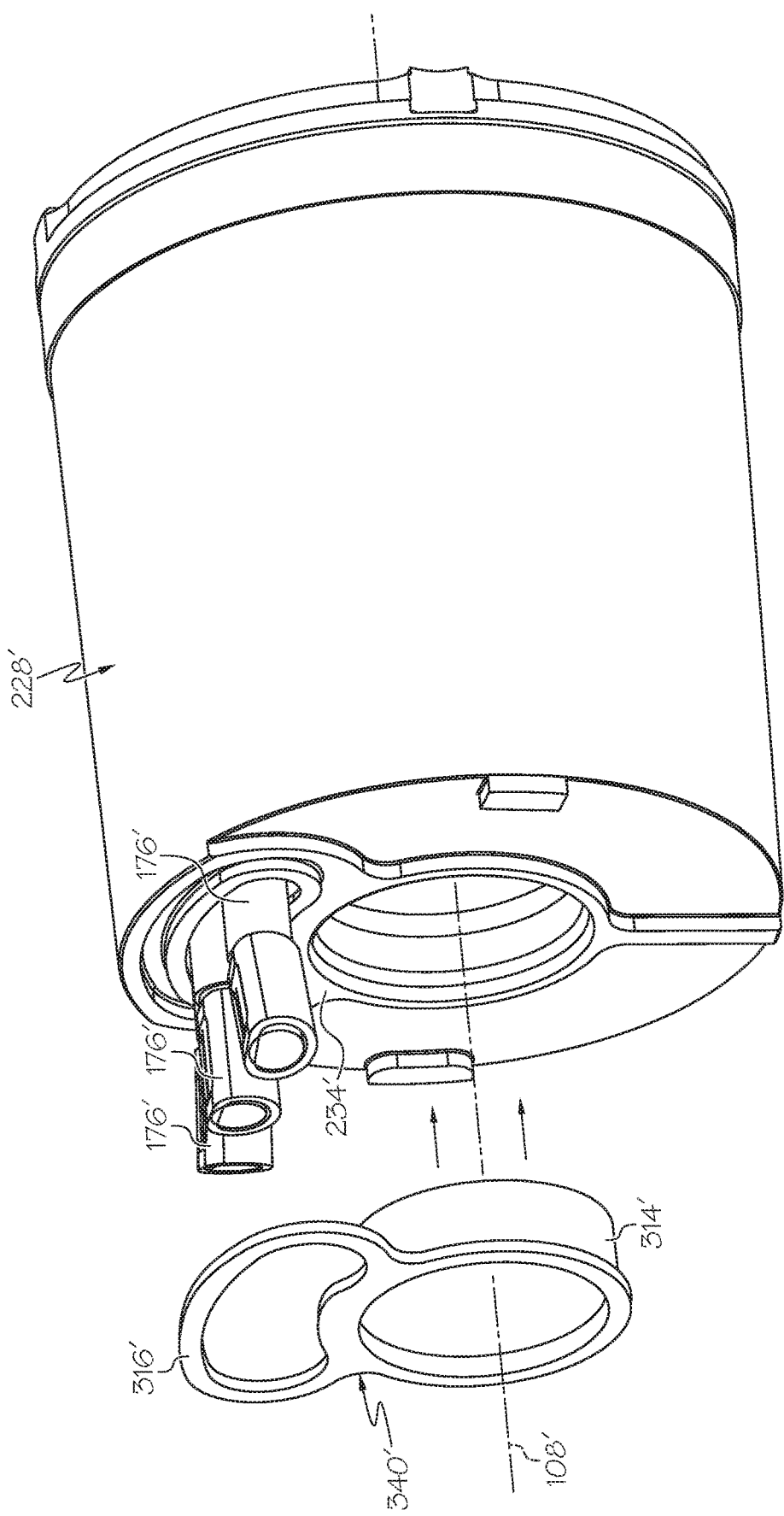

E-CHARGER WITH HYBRID DAMPENING SYSTEM

TECHNICAL FIELD

The present disclosure generally relates to an e-charger and, more particularly, relates to an e-charger with a hybrid dampening system.

BACKGROUND

Some vehicles include a charging device, such as a turbocharger or supercharger, that boosts engine performance by compressing air that is then fed to the engine. These devices may also be employed in fuel cell systems or other systems. In some cases, an e-charger may be provided. The e-charger may include an electric motor that is configured to drive and rotate a compressor wheel for compressing an airflow, which is then fed to an engine, a fuel cell stack, etc.

In some cases, the vehicle may include an electrically driven compressor, or e-charger, for these purposes. However, conventional e-chargers can be bulky, cost prohibitive, difficult to manufacture, and/or may present other issues. The motor may generate heat that can negatively affect performance; however, cooling features may increase the bulkiness, costs, and/or manufacturing difficulties. Furthermore, the motor and/or other components may generate vibration or other loads that can negatively affect performance or manufacturability of the compressor. However, conventional approaches for dampening an e-charger can increase bulkiness of the e-charger, costs, and/or manufacturing difficulties.

Thus, it is desirable to provide an e-charger that is compact, highly manufacturable, and that is cost effective. Other desirable features and characteristics of the present disclosure will become apparent from the subsequent detailed description and the appended claims, taken in conjunction with the accompanying drawings and this background discussion.

BRIEF SUMMARY

In one embodiment, an e-charger is disclosed that includes a shaft supported for rotation about an axis. The e-charger also includes a compressor wheel that is attached to the shaft. The e-charger further includes an electric motor configured to drive the shaft and the compressor wheel in rotation. Also, the e-charger includes a housing that houses the electric motor and at least part of the shaft. Moreover, the e-charger includes a dampening system incorporated in the housing and configured to dampen loads transferring through the housing. The dampening system includes at least one solid-state dampener that is resiliently flexible, and the dampening system includes at least one fluid viscous dampener.

In another embodiment, a method of manufacturing an e-charger is disclosed. The method includes housing an electric motor and part of a shaft in a motor case. The electric motor is configured to drive the shaft and an attached compressor wheel in rotation about an axis. The method also includes housing the motor case and the electric motor within an outer housing with a dampening system disposed between the motor case and the outer housing. The dampening system is configured to dampen loads transferring between the motor case and the outer housing. The dampening system includes at least one solid-state dampener that is resiliently flexible, and the dampening system includes at least one fluid viscous dampener.

In an additional embodiment, an e-charger is disclosed that includes a shaft supported for rotation about an axis and a compressor wheel that is attached to the shaft. The e-charger includes an electric motor configured to drive the shaft and the compressor wheel in rotation. Furthermore, the e-charger includes a housing that houses the electric motor and at least part of the shaft. The housing includes an outer housing with a first member and a second member. The housing includes a motor case that encases the electric motor. The motor case is housed by the outer housing. Also, the e-charger includes a cooling system that supplies a coolant through the housing from an inlet to an outlet for cooling the e-charger. Furthermore, the e-charger includes a dampening system incorporated in the housing and configured to dampen loads transferring through the housing. The dampening system includes a solid-state radial dampener that is disposed radially between the first member and the second member of the outer housing and that is configured to resiliently flex to dampen radial loads transferred between the first and second members. The dampening system also includes a first sealing dampener disposed longitudinally between and sealed to first opposing longitudinal surfaces of the motor case and the outer housing. The first sealing dampener provides a first fluid barrier for the coolant and is configured to resiliently flex to dampen longitudinal loads transferred between the motor case and the outer housing. The dampening system further includes a second sealing dampener disposed longitudinally between and sealed to second opposing longitudinal surfaces of the first member and the second member of the outer housing. The second sealing dampener provides a second fluid barrier for the coolant and is configured to resiliently flex to dampen longitudinal loads transferred between the first member and the second member. Additionally, the dampening system includes a third sealing dampener disposed radially between and sealed to third opposing radial surfaces of the outer housing and the motor case. The third sealing dampener provides a third fluid barrier for the coolant and is configured to resiliently flex to dampen radial loads transferred between the motor case and the outer housing. Also, the dampening system includes a fourth sealing dampener disposed radially between and sealed to fourth opposing longitudinal surfaces of the outer housing and the motor case. The fourth sealing dampener provides a fourth fluid barrier for the coolant and is configured to resiliently flex to dampen longitudinal loads transferred between the motor case and the outer housing. Furthermore, the dampening system includes a plurality of viscous dampeners with coolant provided between opposing nesting radial surfaces of the outer housing and the motor case to provide viscous dampening between the motor case and the outer housing.

BRIEF DESCRIPTION OF THE DRAWINGS

The present disclosure will hereinafter be described in conjunction with the following drawing figures, wherein like numerals denote like elements, and wherein:

FIG. 10 is a detail section view of the e-charger taken from an area indicated in

FIG. 4;

FIG. 12 is a rear perspective exploded view of parts of the e-charger of FIG. 1.

DETAILED DESCRIPTION

Figure 1:
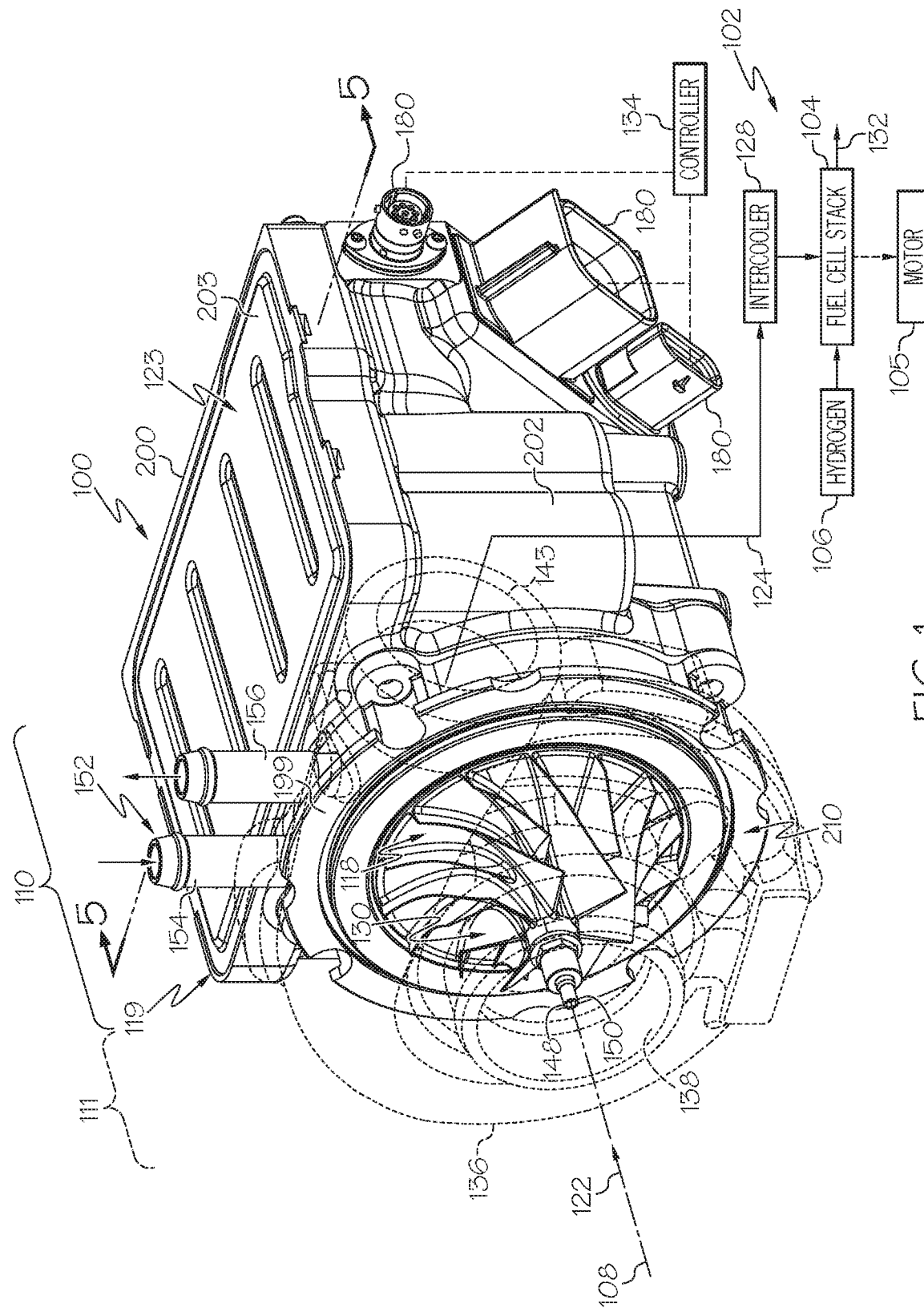
FIG. 1 is a front perspective view of a charging device, such as an e-charger, shown incorporated into a fuel cell system according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved electrically-driven compressor assembly (i.e., an e-charger). The disclosed e-charger may be a device with a motor that drives a compressor wheel for providing a compressed airstream to a downstream component (e.g., to a fuel cell stack, to an internal combustion engine, etc.). Also, the e-charger of the present disclosure may be configured as an electric supercharger, a hybrid turbocharger, an e-boost device, an e-turbo device, an e-assist charging device, or other related component.

Furthermore, example embodiments disclosed herein include a dampening system of an e-charger. The e-charger may include a dampening system with one or more dampeners provided for dampening forces translating through the e-charger and/or supporting structure(s).

In particular, the dampener(s) may include one or more features, shapes, dimensions, material properties, and/or other characteristics that provide improved dampening loads transferring through a housing of the e-charger. Additionally, the dampener(s) may be incorporated within the e-charger in ways that improve the dampening function.

Furthermore, the e-charger of the present disclosure may include a hybridized dampening system. For example, the e-charger may include different types of dampeners.

In some examples, the e-charger may include at least one dampener of a first type that is solid and resiliently flexible (e.g., a dampener including an elastomeric material, a dampener that is flexible and biased toward an unflexed or neutral position, a dampener with two or more parts that are connected by a joint biased toward a certain position, etc.). These dampeners may be referred to as "solid-state dampeners" since they remain in a solid state, they resiliently flex, and rely on material characteristics of the solid material comprising the dampener.

The e-charger may include at least one dampener of a second type, such as a fluid viscous dampener that includes a fluid and one or more fluid passages. There may be a plurality of fluid viscous dampeners, each with an amount of fluid that is provided between corresponding surfaces of the housing to provide viscous dampening.

Additionally, in some embodiments, at least one dampener may provide dampening and also provide an additional function. For example, a dampener may include a sealing dampener that is disposed between and sealed to a pair of (at least two) opposing surfaces. The sealing dampener may retain a fluid within a predetermined fluid passage of the e-charger and may also resiliently deflect and dampen energy (e.g., vibrations) transferring between the opposing surfaces.

The support structure (e.g., the housing members) for the dampener(s) may include various features that improve robustness of the e-charger, improve manufacturability, and/or provide other benefits. Furthermore, the dampening system may allow certain types of bearings to be incorporated in the e-charger for added benefit. The e-charger may operate at high efficiency in a wide variety of operating conditions as a result of the dampening system of the present disclosure. The e-charger may be highly robust due to the dampening system of the present disclosure. The layout and construction of the dampening system may be relatively simple and compact and, yet, may provide effective dampening for the e-charger. These features may also improve manufacturing efficiency and/or reduce manufacturing costs for the e-charger.

FIG. 1 is a schematic view of an example e-charger 100 according to example embodiments of the present disclosure. It will be appreciated that the term "e-charger" as used herein will be understood broadly by those in the art, for example, to include devices with an electrically driven compressor wheel regardless of where the e-charger 100 is incorporated, the type of system in which the e-charger 100 is incorporated, etc. It will also be appreciated that the e-charger 100 of the present disclosure may also be referred to as an electrically driven compressor assembly. Also, the e-charger 100 of the present disclosure may be operatively attached to an exhaust-driven turbine wheel, for example, in a hybrid turbocharger or e-assist turbocharger. The e-charger 100 may also be configured as an electric supercharger, as an e-boost device, e-turbo, or other related component. Also, the e-charger 100 may be fluidly and otherwise operatively coupled to additional charging devices, either upstream or downstream of the e-charger 100.

As shown, the e-charger 100 may be incorporated within a fuel cell system 102. Also, as shown, the e-charger 100 may be configured as an electric compressor device (i.e., electric supercharger) with a single-stage compressor.

Generally, the e-charger 100 may include a motor section 110 with a first end 199 and a second end 200. The e-charger 100 may also include a compressor section 111. The motor section 110 may drive a rotating group 118 of the e-charger 100 about an axis 108 relative to a housing 119 of the e-charger 100, thereby providing a compressed airstream (represented by arrow 124) to a fuel cell stack 104 of the fuel cell system 102.

It will be appreciated that the e-charger 100 and/or features of the present disclosure may be configured differently than the illustration. Also, it will be appreciated that the e-charger 100 may be incorporated within a system other than a fuel cell system. For example, the e-charger 100 may be configured for supplying the compressed airstream 124 to an internal combustion engine, to another charging device, etc.

The motor section 110 of the e-charger 100 may include an electric motor 103 with a stator 146 and a rotor 148 (FIGS. 2, 3, and 5), which are centered on the axis 108. The rotor 148 may be fixed to a shaft 150 for rotation as a unit about the axis 108. The shaft 150 may project from the rotor 148 and away from the first end 199 of the motor section 110. Furthermore, the motor section 110 may include one or more parts of the housing 119. For example, the housing 119 may include a motor housing 123, which houses, encapsulates, and/or surrounds the stator 146 and at least part of the rotor 148 in the motor section 110.

The compressor section 111 may include a compressor wheel 130, which may be mounted on the shaft 150 at the first end 199 of the motor section 110. The compressor wheel 130 may be fixed to the rotor 148 via the shaft 150 to rotate as a unit with the rotating group 118 of the e-charger 100. The compressor wheel 130 may be fixed to the shaft 150 via one or more fasteners, weldments, and/or other attachment. The compressor section 111 may also include one or more parts of the housing 119. The compressor section 111 may include a compressor housing member 136 (shown in phantom in FIG. 1). The compressor housing member 136 may be fixed to a side of the motor housing 123 (e.g., by fasteners, weldments, or other attachments). The compressor housing member 136 may include a volute structure with an axial inlet 138 and an outlet 143. The compressor housing member 136 may be a unitary, one-piece compressor housing member 136. The axial inlet 138 may be tubular, straight, and centered on the axis 108. The outlet 143 may be directed outward and tangential to a circle that is centered on the axis 108.

The motor 103 may drivingly rotate the compressor wheel 130 within the compressor housing member 136 about the axis 108. An inlet airstream (represented by arrow 122 in FIG. 1) may flow into the inlet 138 and flow through the compressor housing 136. A resultant compressed airstream (represented by arrow 124) may be directed from the outlet 143. In some embodiments, the compressed airstream 124 may be cooled by an intercooler 128 and may flow to the fuel cell stack 104 for boosting the operating efficiency of the fuel cell system 102.

The fuel cell stack 104 (FIG. 1) may contain a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an additional electric motor 105 and/or other connected electrical devices. The fuel cell system 102 may be included in a vehicle, such as a car, truck, sport utility vehicle, van, motorcycle, aircraft, etc. Accordingly, in some embodiments, the electric motor 105 may convert the electrical power generated by the fuel cell stack 104 to mechanical power to drive and rotate an axle (and, thus, one or more wheels) of the vehicle. In some embodiments, the fuel cell stack 104 may provide electricity for the stator 146 to drivingly rotate the rotor 148 and other components of the rotating group 118 of the e-charger 100. However, it will be appreciated that the fuel cell system 102 may be configured for a different use without departing from the scope of the present disclosure.

Furthermore, an exhaust gas stream (represented by arrow 132) from the fuel cell stack 104 may be exhausted to atmosphere as represented in FIG. 1. Stated differently, the exhaust gas stream 132 may be directed away from the e-charger 100. In other embodiments, the exhaust gas stream 132 may be directed back toward the e-charger 100, for example, to drive rotation of a turbine wheel that is included in the rotating group 118. This may, in turn, drive rotation of the compressor wheel 130, for example, to assist the electric motor 103.

The e-charger 100 and/or other components of the fuel cell system 102 may be controlled by a controller 134 (FIG. 1). The controller 134 may be a computerized system with a processor, various sensors, and other components for electrically controlling operation of the motor 112, the fuel cell stack 104, and/or other features of the system 102. In some embodiments, the controller 134 may define or may be part of the electrical control unit (ECU) of a vehicle.

Accordingly, the controller 134 may generate control commands for turning the motor 103 of the e-charger 100 ON and OFF and/or for changing the speed of the motor 103. The controller 134 may generate these control commands based on input from sensors. Thus, the speed of the motor 103 (and, thus, the rotational speed of the compressor wheel 130) may be controlled, for example, based on a sensed throttle position or other sensed characteristic of the system.

Furthermore, the e-charger 100 may include a cooling system, which is indicated generally at 152 in the Figures, and which will be discussed in detail below according to example embodiments. The cooling system 152 may include an inlet 154, an outlet 156 and a plurality of passages 158 (FIGS. 5-7) defined through the housing 119 for conducting a flow of coolant (e.g., liquid coolant) from the inlet 154 to the outlet 156. The cooling system 152 may define a cooling jacket that surrounds a majority of the motor 103. As will be discussed, the cooling system 152 may be routed through the housing 119 to provide effective cooling while also ensuring that the e-charger 100 is compact and relatively lightweight. Additionally, the cooling system 152 provides various manufacturing advantages as will be discussed.

Figure 3:
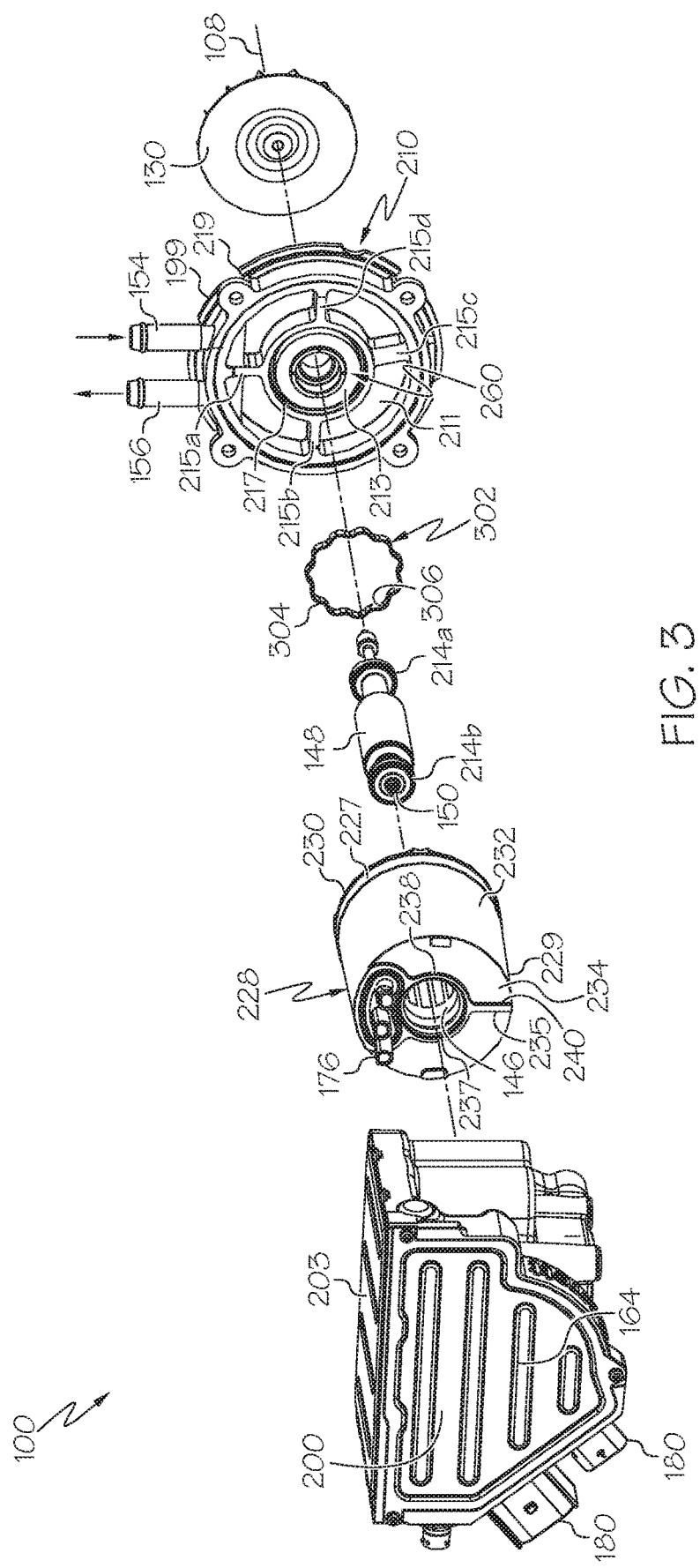
FIG. 3 is a rear perspective exploded view of the e-charger of FIG. 1.
Figure 4:
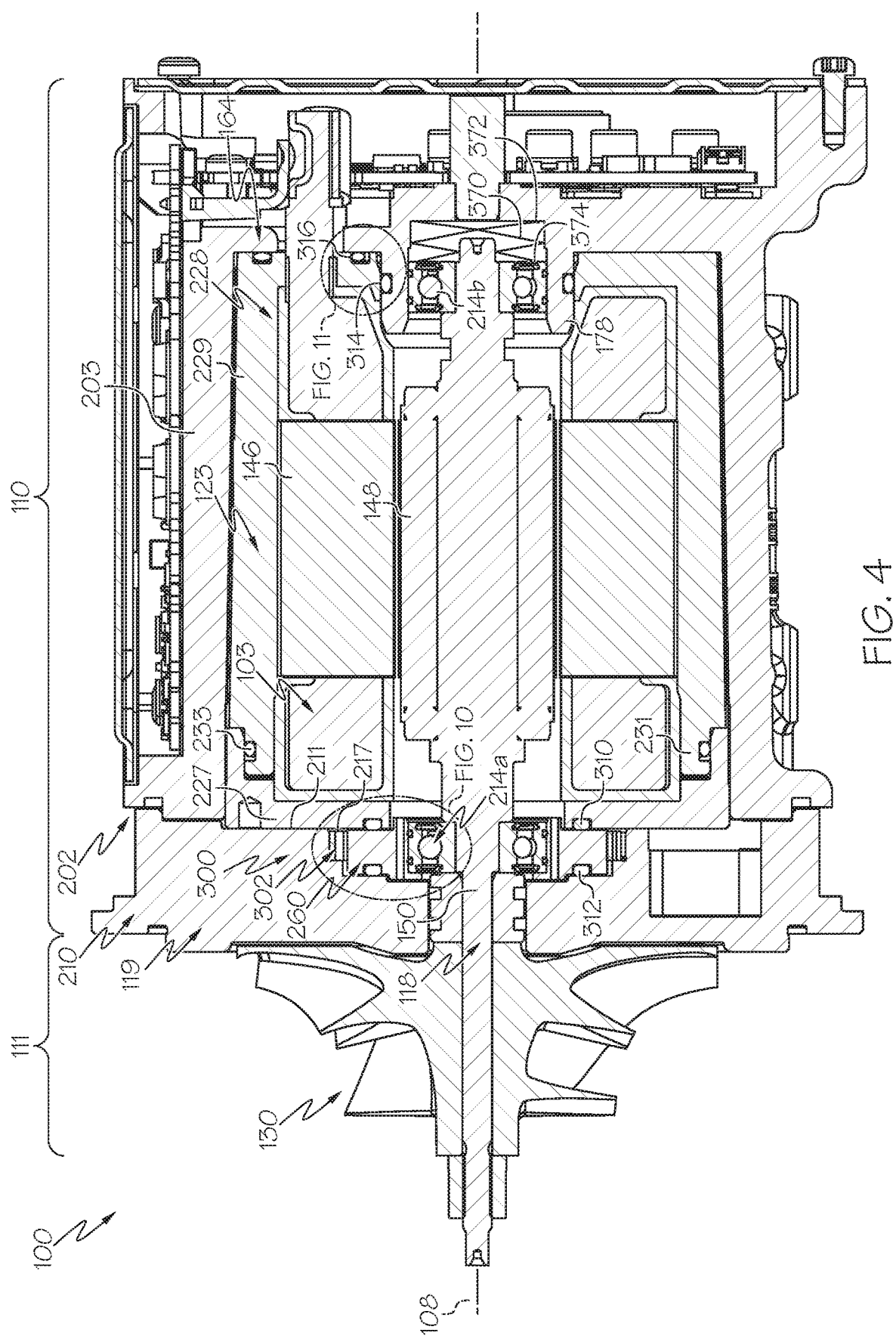
FIG. 4 is a longitudinal section view of the e-charger of FIG. 1.

The e-charger 100 may additionally include a dampening system, which is indicated generally at 300 in FIG. 4. The dampening system 300 may be configured for dissipating energy (e.g., dampening vibration and/or other loads) that transfers through the e-charger 100. As shown and as will be described below in reference to FIGS. 3, 4, and 8-12, the dampening system 300 may comprise a hybrid dampening system. For example, in some embodiments, the dampening system 300 may include solid state, mechanical dampeners that resiliently deflect to dissipate energy that transfers through the e-charger 100. In addition, in some embodiments, the dampening system 300 may include one or more hydrodynamic or viscous dampeners that rely on fluids for dissipating energy. Additionally, in some embodiments, at least one dampener of the dampening system 300 may serve dual purposes (e.g., a resilient seal that serves to dissipate energy and that seals a fluid within a passage of the e-charger 100).

Figure 2:
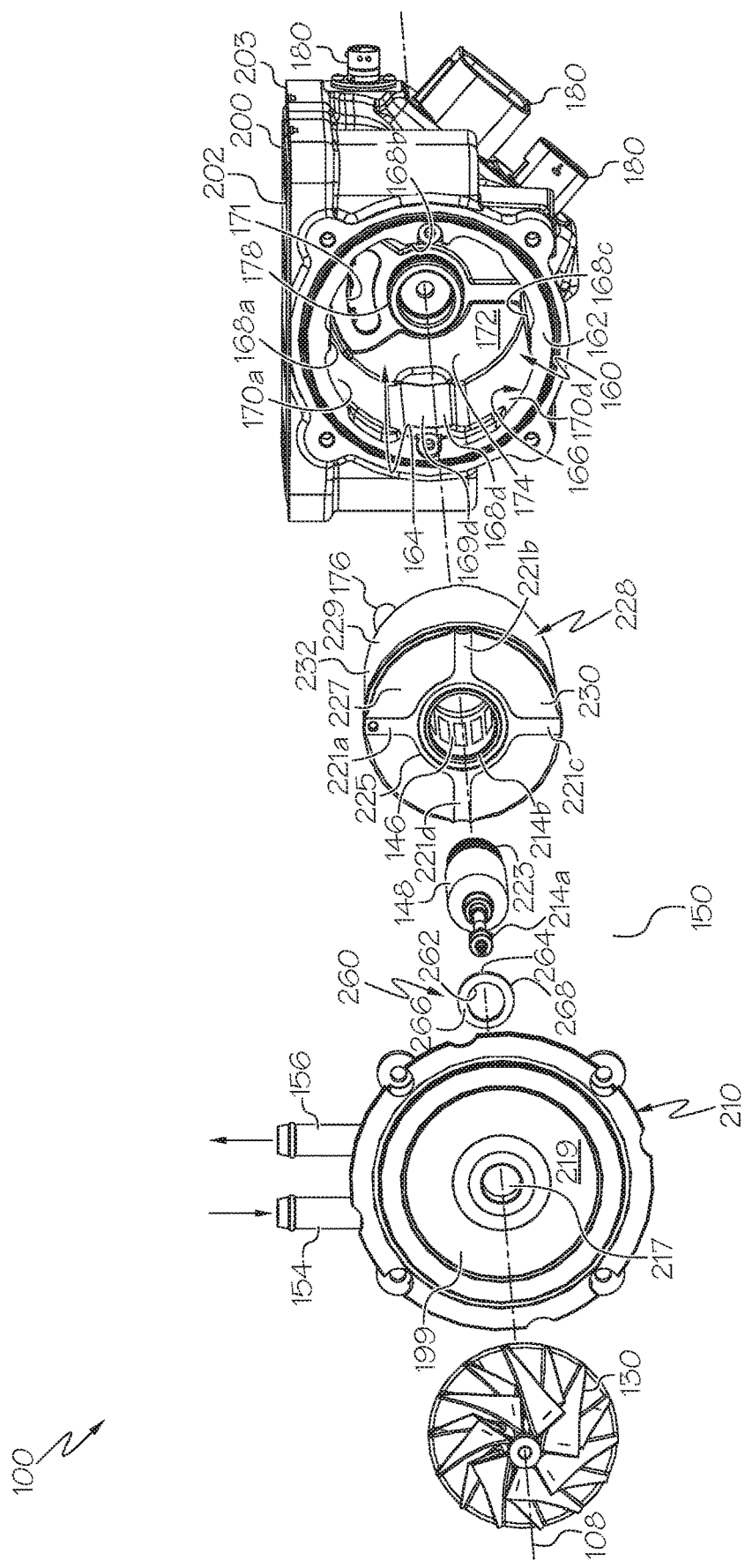
FIG. 2 is a front perspective exploded view of the e-charger of FIG. 1.
Figure 5:
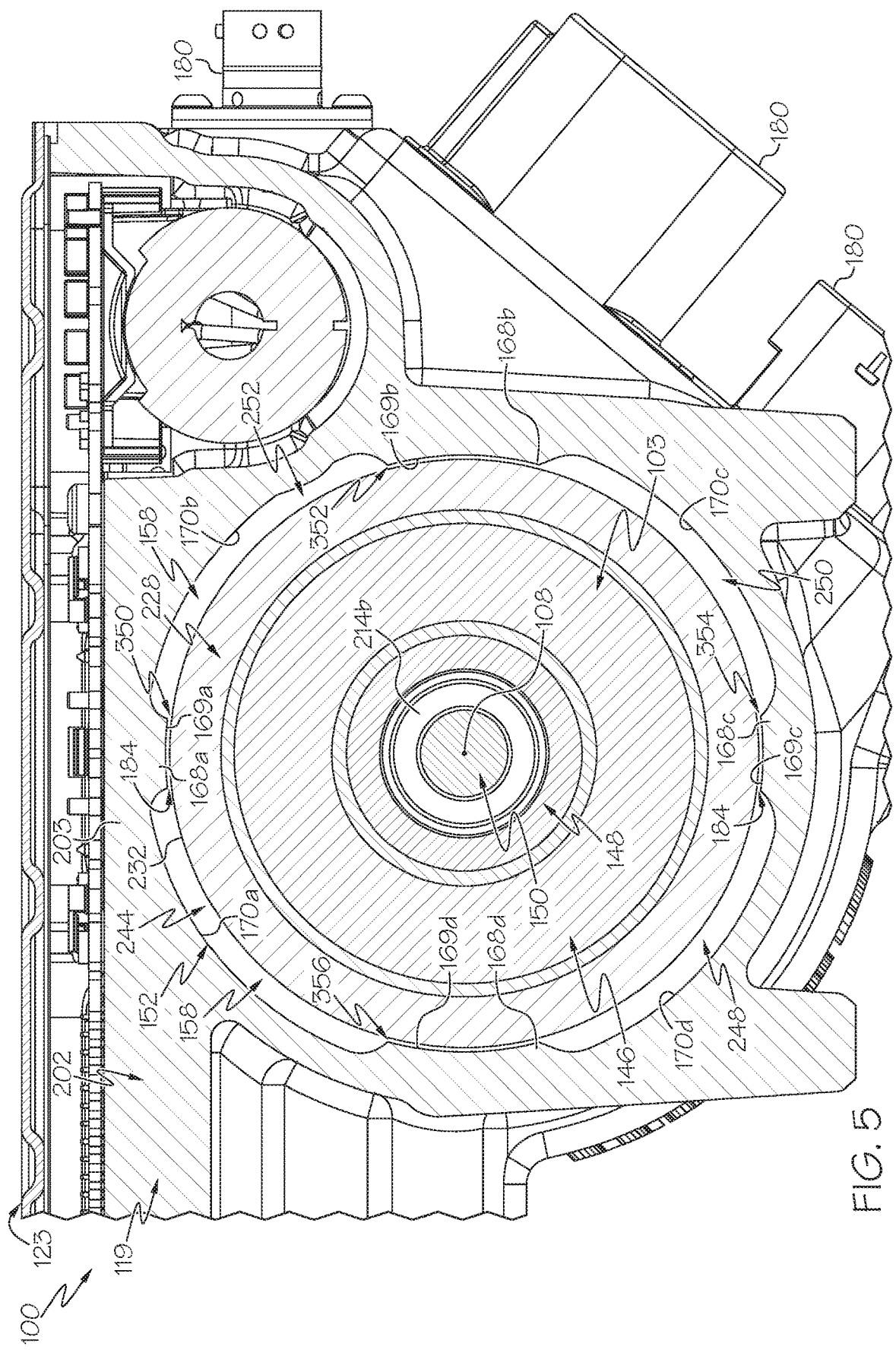
FIG. 5 is a cross-sectional view of the e-charger taken along the line 5-5 of FIG. 1.

Referring now to FIGS. 1-5, the motor housing 123 of the e-charger 100 will now be discussed in greater detail according to example embodiments. The motor housing 123 may include an outer housing 202 (FIGS. 1 and 4) with an outer body 203 (FIGS. 2 and 3) (i.e., outer structure, outer member, etc.). The outer body 203 may be block-shaped with a variety of rigid, strong, supportive structures made, for example, from metal. The outer body 203 may include a receptacle 160 (FIG. 2). The receptacle 160 may be generally barrel-shaped, cylindrical, etc. The receptacle 160 may be centered on the axis 108 and recessed along the axis 108 from the first end 199 of the motor section 110 toward the second end 200. The receptacle 160 may be open at the first end 199 and closed off at the second end 200 by an end 164 (FIG. 3) of the outer body 203. As shown in FIG. 2, the receptacle 160 may include a circular rim 162. The receptacle 160 may also include an inner diameter surface 166 with one or more projections 168a, 168b, 168c, 168d (FIGS. 2 and 5).

The projections 168a-168d may be elongate rails that project radially inward toward the axis 108. The projections 168a-168d may extend longitudinally along the axis 108 (e.g., substantially parallel to the axis 108) from the first end 199 to the second end 200 of the motor section 110. The projections 168a-168d may be spaced substantially equally about the axis 108. As shown, there may be four projections 168a-168d, which are spaced apart by ninety degrees (90°) from neighboring ones of the projections 168a-168d with respect to the axis 108. Each projection 168a-168d may include a respective inward-facing nest surface 169a, 169b, 169c, 169d. The nest surfaces 169a-169d may be substantially smooth and may be arcuately curved about the axis 108. The nest surfaces 169a-169d may also extend longitudinally along (e.g., parallel to) the axis 108 between the first end 199 and the second end 200.

Also, the inner diameter surface 166 of the receptacle 160 may include intermediate surfaces 170a, 170b, 170c, 170d, which are each defined circumferentially between neighboring pairs of the nest surfaces 169a-169d. For example, as shown in FIG. 5, the intermediate surface 170a may be defined between the nest surface 169a and the nest surface 169d. The intermediate surface 170b may be defined between the nest surface 169a and the nest surface 169b. The intermediate surface 170c may be defined between the nest surface 169b and the nest surface 169c. The intermediate surface 170d may be defined between the nest surface 169c and the nest surface 169d. Generally, the intermediate surfaces 170a-170d may contour arcuately about the axis 108 and may extend longitudinally along the axis 108 from the first end 199 to the second end 200 of the motor section 110. The intermediate surfaces 170a-170d may also include various contoured surfaces that define the transitions to respective ones of the nest surfaces 169a-169d.

Furthermore, the outer body 203 may include the end 164. The end 164 may include one or more relatively flat panels arranged normal to the axis 108 and that define a majority of the second end 200 of the motor section 110. As shown in FIG. 2, the end 164 may include an inner surface 172 that faces inwardly along the axis 108 and that defines the closed longitudinal end of the receptacle 160, proximate the second end 200. The inner surface 172 may include one or more recesses 174. For example, there may be two arcuate recesses 174 arranged on opposite sides of the axis 108. Furthermore, there may be an opening 171 for receiving electrical connectors 176 of the motor 112. In addition, the end 164 may include a bearing mount 178. The bearing mount 178 may be a hollow, cylindrical projection that is centered on the axis 108 and that projects inwardly along the axis 108 from surrounding portions of the inner surface 172 partially into the receptacle 160.

The outer body 203 may further include one or more electrical connector structures 180 that project substantially radially outward. The electrical connector structures 180 may support one or more electrical connectors that provide electrical communication with the controller 134.

The outer housing 202 may further include an end plate 210 (i.e., an end member). The end plate 210 may be round, thin and disposed transverse (e.g., substantially perpendicular) to the axis 108. The end plate 210 may be removably attached to the outer body 203 at the first end 199 of the motor section 110 to cover over and close off the receptacle 160. The end plate 210 may be removably attached and fixed to the outer body 203 via fasteners in some embodiments. The end plate 210 may include an inner surface 211 (FIG. 3) that faces inward into the receptacle 160. The end plate 210 may further include a central aperture 217 that is centered on the axis 108. The inner surface 211 may also include a plurality of projections 215a, 215b, 215c, 215d that are elongate and that project radially outward from the central aperture 217 toward the outer diameter of the end plate 210. There may be four projections 215a, 215b, 215c, 215d in some embodiments, and they may be spaced substantially equally about the axis 108 (e.g., spaced apart by ninety degrees (90°)).

Figure 8:
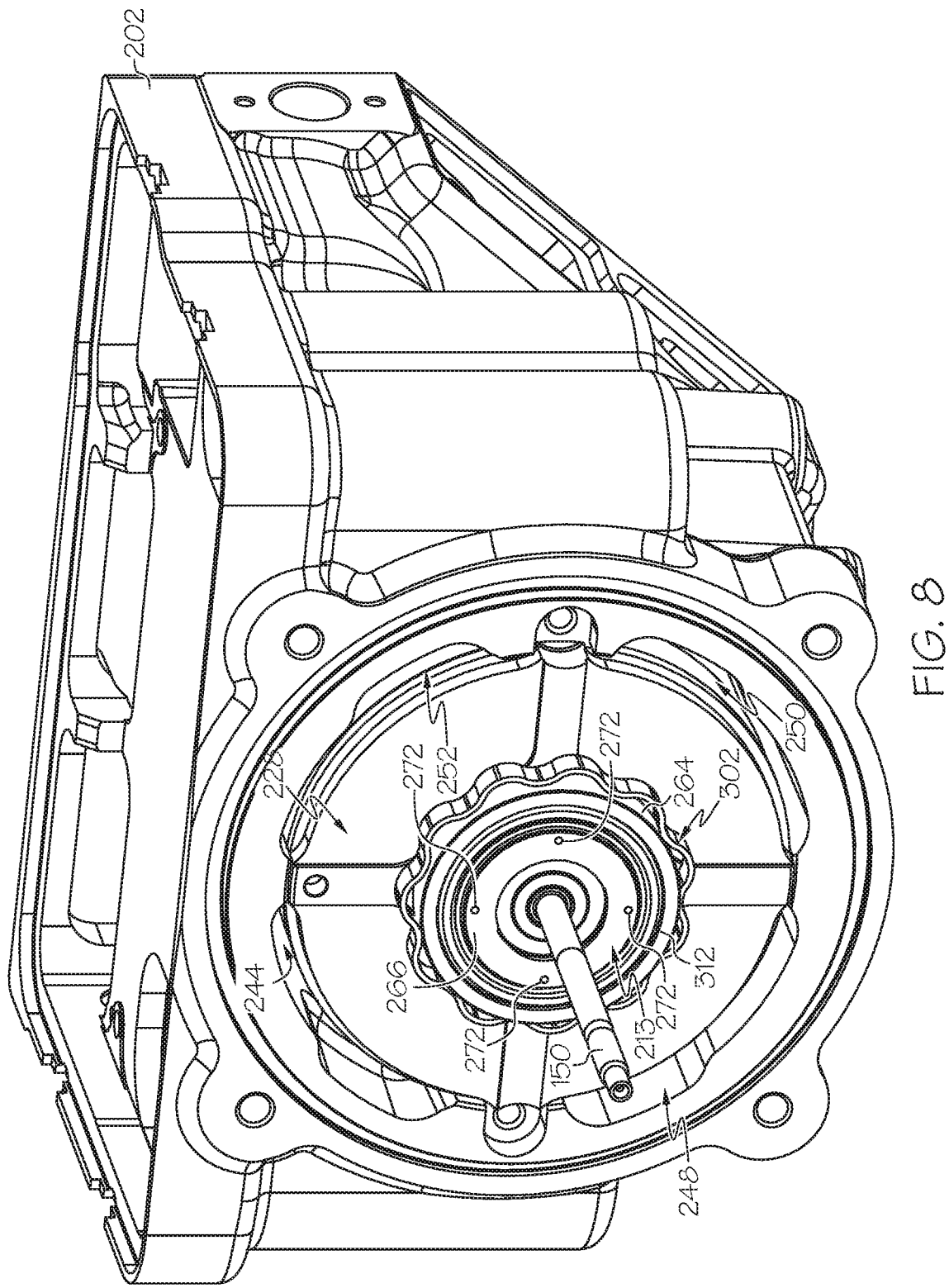
FIG. 8 is a front perspective view of portions of the e-charger of FIG. 1.
Figure 10:
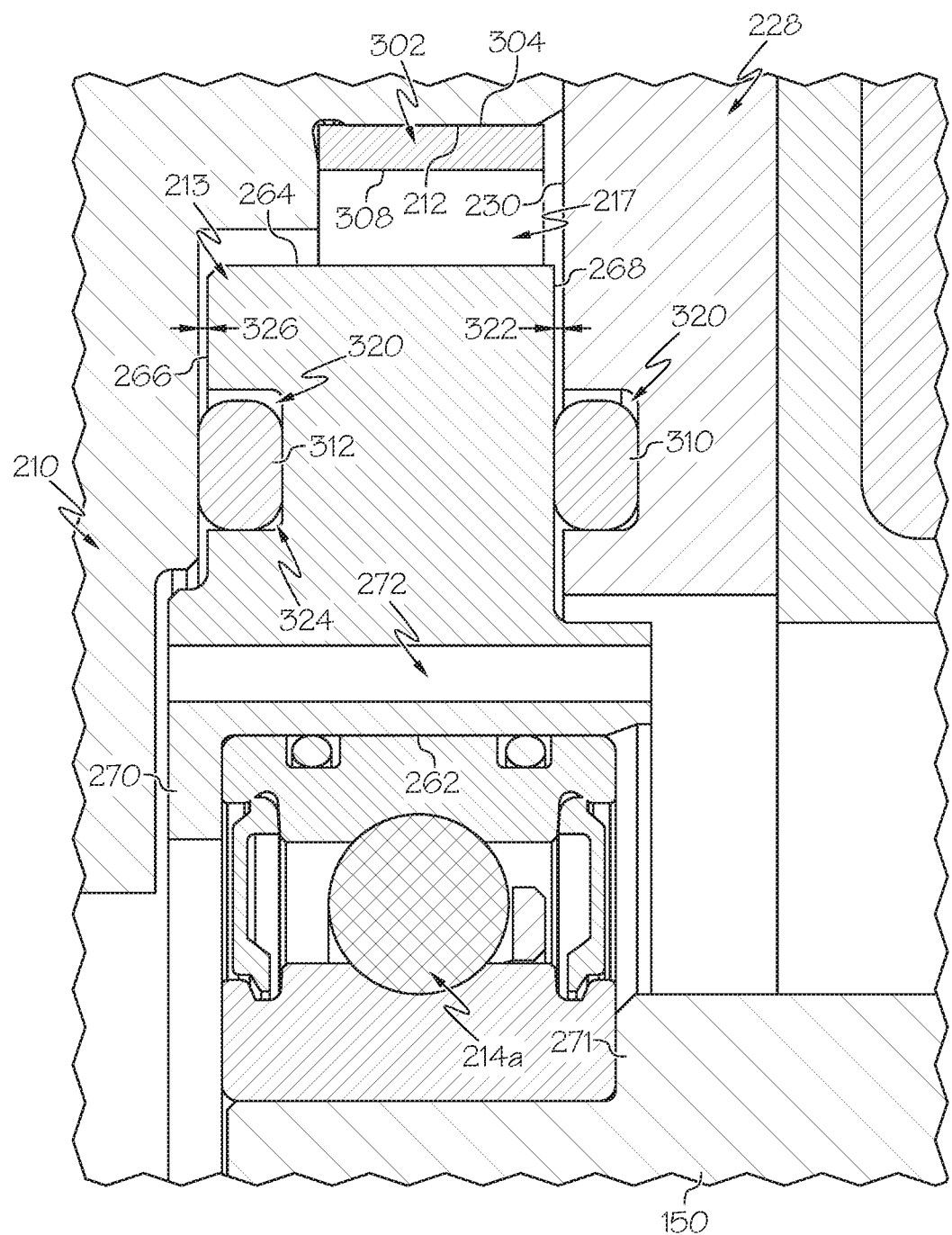

The motor housing 123 may also include a bearing mount 213 (FIGS. 2-4 and 10). The bearing mount 213 may be received in the central aperture 217 of the end plate 210. The bearing mount 213 may be considered a member of the outer housing 202, and the end plate 210 may be considered another member of the outer housing 202. As shown in FIGS. 2 and 10, the bearing mount 213 may be annular with an inner diameter surface 262, an outer diameter surface 264, a first longitudinal side surface 266, and a second longitudinal side surface 268. The first and/or second longitudinal side surfaces 266, 268 may face in opposite directions, generally along the axis 108. In some embodiments, the first and/or second longitudinal side surfaces 266, 268 may include substantially flat surfaces that are substantially perpendicular to the axis 108. The bearing mount 213 may also include a shoulder 270 (FIG. 10). The shoulder 270 may project radially inward toward the axis 108 and may define part of the first side surface 266 and may project from the inner diameter surface 262. Also, as shown in FIG. 10, the bearing mount 213 may include one or more fluid apertures 272 (e.g., through-holes) that extend through the bearing mount 213 from the first side surface 266 to the second side surface 268. There may be a plurality of apertures 272, and the apertures 272 may be spaced apart evenly about the axis 108 as shown in FIG. 8.

The shaft 150 may pass through the bearing mount 213. The compressor wheel 130 may be fixed to the shaft 150 to be disposed at the first side surface 266 of the bearing mount 213 and at an outer surface 219 of the end plate 210.

The e-charger 100 may further include one or more bearings 214a, 214b. The bearing(s) 214a, 214b may support the shaft 150 for rotation about the axis 108. In some embodiments, there may be two bearings 214a, 214b, and both may be a roller-type bearing.

One bearing 214a (a first bearing) may be disposed proximate the first end 199 and may include an outer member (e.g., an outer race) that is fixed within the bearing mount 213 of the end plate 210, an inner member (e.g., an inner race) that is fixed to the shaft 150, and a plurality of roller elements that are disposed between the outer member and the inner member for supporting rotation of the shaft 150. As shown in FIG. 10, the outer member of the bearing 214a may engage the inner diameter surface 262 of the bearing mount 213 and may also longitudinally abut the shoulder 270. Furthermore, the inner member of the bearing 214 may longitudinally abut another shoulder 271 that is defined on the shaft and that faces longitudinally toward the first end 199 (i.e., in the opposite direction that the shoulder 270 faces). Accordingly, the bearing 214 may engage the bearing mount 213 and the shaft 150 via friction (at the opposing radial surfaces) and may also engage via an interference fit (due to the shoulders 270, 271).

Figure 11:
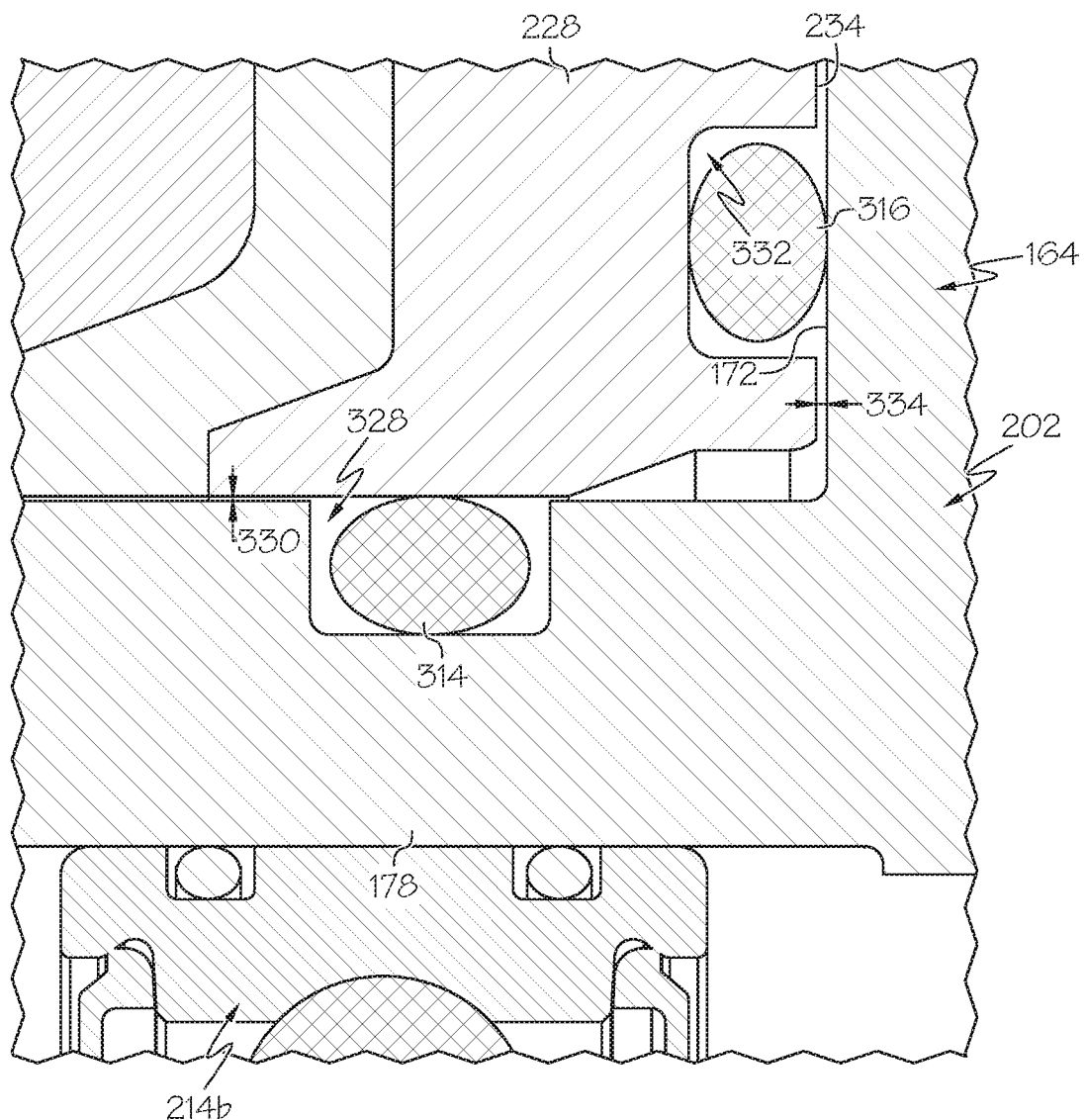
FIG. 11 is a detail section view of the e-charger taken from an area indicated in FIG. 4.

Another bearing 214b (a second bearing) may be disposed proximate the second end 200 of the e-charger 100. As shown in FIGS. 4 and 11, the bearing 214b may include an outer member (an outer race) disposed within and engaged with the bearing mount 178 of the end 164. In some embodiments, the inner diameter surface of the bearing mount 178 that engages the outer member of the bearing 214b may have a radius that remains substantially constant along the longitudinal thickness of the bearing 214b. In other words, the bearing 214b may frictionally engage the inner diameter surface of the bearing mount 178 and may not necessarily have an interference fit with the bearing mount 178. The bearing 214b may also include an inner member (an inner race) that is fixed to the shaft 150 as well as roller elements disposed between the inner and outer members (races).

The motor housing 123 may further include a motor case 228. The motor case 228 may encase the motor 103, and the motor case 228 may be received within the receptacle 160 of the outer body 203. The motor case 228 may be substantially cylindrical and hollow. The exterior of the motor case 228 may include a first longitudinal end face 230, an outer diameter surface 232, and a second longitudinal end face 234. The outer diameter surface 232 may extend circumferentially about the axis 108 and may extend longitudinally between the first and second longitudinal end faces 230, 234. The outer diameter surface 232 may be centered with respect to the axis 108. A majority of the outer diameter surface 232 may be substantially smooth and continuous about the axis 108. The first and second longitudinal end faces 230, 234 may be disposed on opposite ends of the outer diameter surface 232 with the first longitudinal end face 230 proximate the first end 199 of the motor section 110 and the second longitudinal end face 234 proximate the second end 200. The first and second longitudinal end faces 230, 234 may be annular and may be disposed substantially perpendicular to the axis 108.

The first longitudinal end face 230 may include a plurality of rail-like projections 221a, 221b, 221c, 221d (FIG. 2) that project along the axis 108 toward the first end 199. Each projection 221a-221d may extend radially from a central opening 223 to the outer diameter of the end face 230. In some embodiments, there may be four projections 221a-221d that are spaced apart equally about the axis 108 (e.g., spaced apart by ninety degrees (90°)). The inner ends of the projections 221a-221d may also be flush with an annular projection 225 that encircles the central opening 223. The second longitudinal end face 234 may include a projection 235 (FIG. 3) that projects along the axis 108 toward the second end 200 from surrounding areas of the face 234. A portion of the projection 235 may extend about the connectors 176 and about a central opening 237 of the end face 234. Another portion of the projection 235 may be rail-shaped and may extend in the radial direction away from the central opening 237 to the outer diameter of the end face 234.

The rotor 148 and the stator 146 may be disposed longitudinally between the first and second longitudinal end faces 230, 234, and the outer diameter surface 232 may continuously surround and cover over the stator 146. The shaft 150 may extend through the central openings 223, 237 to connect to the bearings 214a, 214b.

In some embodiments, the motor case 228 may be formed via a casting process and may be formed of metal. Also, as shown in FIGS. 2-4, the motor case 228 may be a multi-part shell conforming in shape to the stator 146. For example, a first member 227 of the motor case 228 may define the first longitudinal end face 230, and a second member 229 of the motor case 228 may define the second longitudinal end face 234 and a majority of the outer diameter surface 232. Thus, in some embodiments, the second member 229 may be a hollow cylindrical structure with an open end that is closed off and covered by the first member 227. Also, as shown in FIG. 4, the first member 227 may receive an upper rim portion 231 of the second member 229 and may be fixedly attached thereto. A first seal member 233 (FIG. 4) may be included for creating a substantially hermetic seal between the first and second members 227, 229. The first seal member 233 may be an O-ring that is received in an outer diameter groove of the second member 229 and that seals against a substantially smooth opposing surface of the first member 227.

The motor case 228 and the motor 103 therein may be received within the outer housing 202. Specifically, the motor case 228 may be received within the receptacle 160 of the outer body 203, and the end plate 210 may be fixed to the rim 162 (i.e., the end plate 210 and outer body 203 cooperatively house the motor case 228 and the motor 103 therein). The motor case 228 may be received in the receptacle 160 with the second longitudinal end face 234 facing (opposing) the inner surface 172 of the end 164. Also, the outer diameter surface 232 may oppose the inner diameter surface 166 of the outer housing 202. Furthermore, with the end plate 210 installed on the outer housing 202, the first longitudinal end face 230 may oppose the inner surface 211. Additionally, there may one or more features (i.e., anti-rotation features) that retain the motor case 228 against rotation about the axis 108 relative to the outer housing 202.

As mentioned above, the e-charger 100 may include the cooling system 152 (i.e., coolant jacket, cooling circuit, etc.). The cooling system 152 may include a plurality of fluid channels, reservoirs, passages, circuits, etc. that receive one or more flows of liquid coolant. The coolant may flow through the cooling system 152 and remove heat from the e-charger 100 to maintain high operating efficiency. The cooling system 152 and flow therethrough is illustrated schematically in FIGS. 6 and 7. The cooling system 152 may extend through the motor housing 123, and a majority of the cooling system 152 may be cooperatively defined by (and defined between) the outer housing 202 and the motor case 228. The plurality of fluid passages 158 of the cooling system 152 may be connected in-series in some embodiments from the inlet 154 to the outlet 156. Fluid coolant may pass from the inlet 154, through the passages 158, and out via the outlet 156, and heat may transfer to the coolant and out of the e-charger 100 to maintain operations within a predetermined temperature range. For example, heat from the motor 222, the bearings 214a, 214b, and/or the housing 123 may transfer to the coolant to be carried away from the e-charger 100.

In some embodiments, different ones of the plurality of passages 158 may be separated by one or more fluid boundaries 184 (i.e., dams, barriers, fluid retainers, etc.) as will be discussed, the motor case 228 may include a projection that partly defines the fluid boundary member, and the outer housing 202 may include a surface that nests with the projection. The surfaces may nest to cooperatively define the respective fluid boundary 184. The surfaces may "nest" in a variety of ways without departing from the scope of the present disclosure. For example, the surfaces may be flat and planar but closely adjacent to nest together. Also, in some embodiments, the surfaces may have corresponding contours, shapes, etc. One nest surface may be concave while the other may be convex and may have corresponding radii in some embodiments. These surfaces may or may not come into abutting contact.

As shown in FIGS. 2, 3, 6, and 7, the inlet 154 and the outlet 156 may both be disposed proximate the first end 199. Also, in some embodiments, the inlet 154 and the outlet 156 may be substantially parallel (i.e., the axes of the inlet 154 and outlet 156 may be straight and substantially parallel). Furthermore, the inlet 154 and the outlet 156 may be disposed on a common side of the axis 108 as shown. The inlet 154 and the outlet 156 may extend radially through the end plate 210. With the inlet 154 and outlet 156 in this arrangement, the e-charger 100 may be compact and coolant lines to/from the e-charger 100 may be incorporated and attached easily to the fuel cell system 102.

Figure 6:
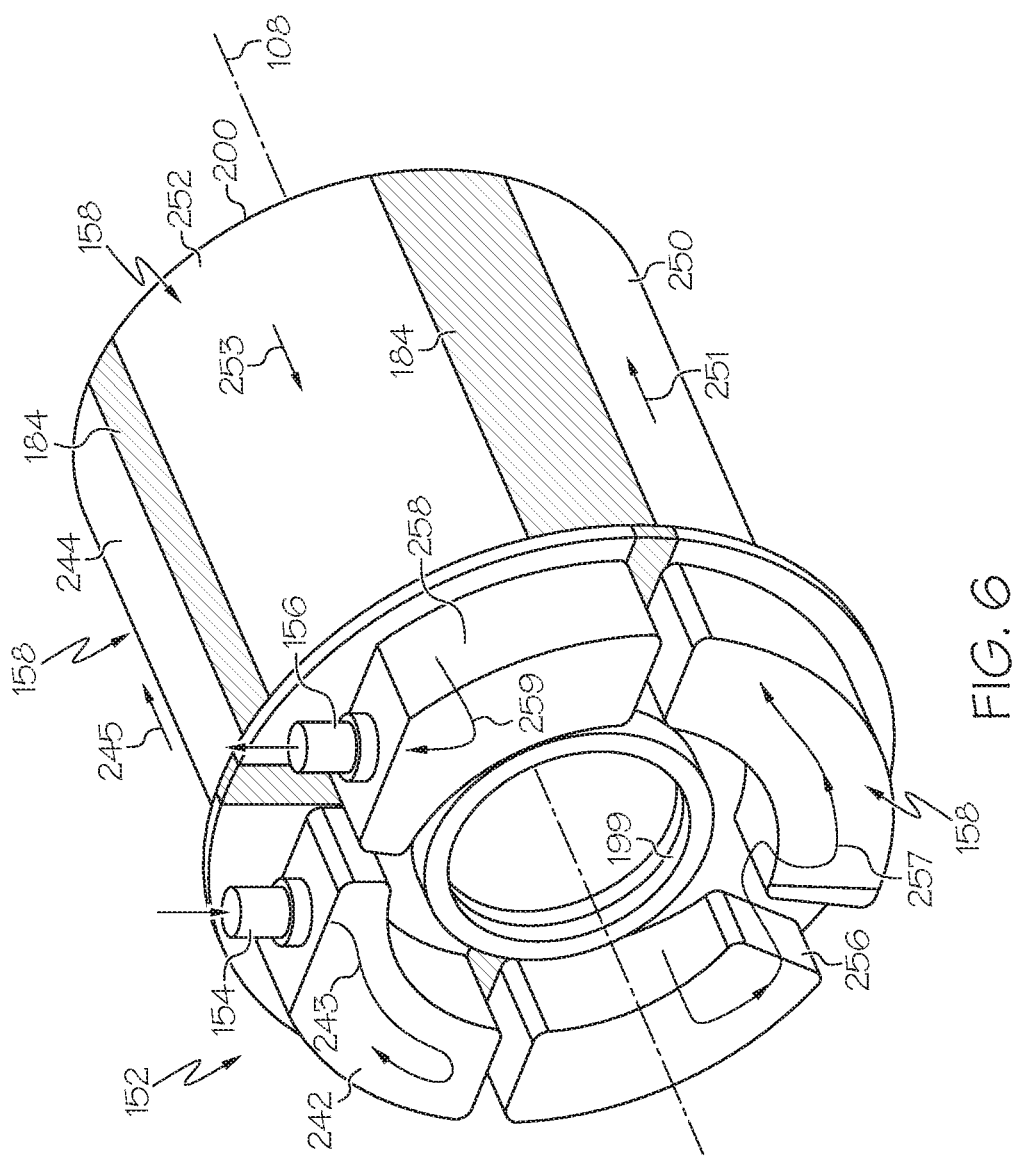
FIG. 6 is a front perspective view of a coolant flow circuit through the e-charger of FIG. 1.
Figure 7:
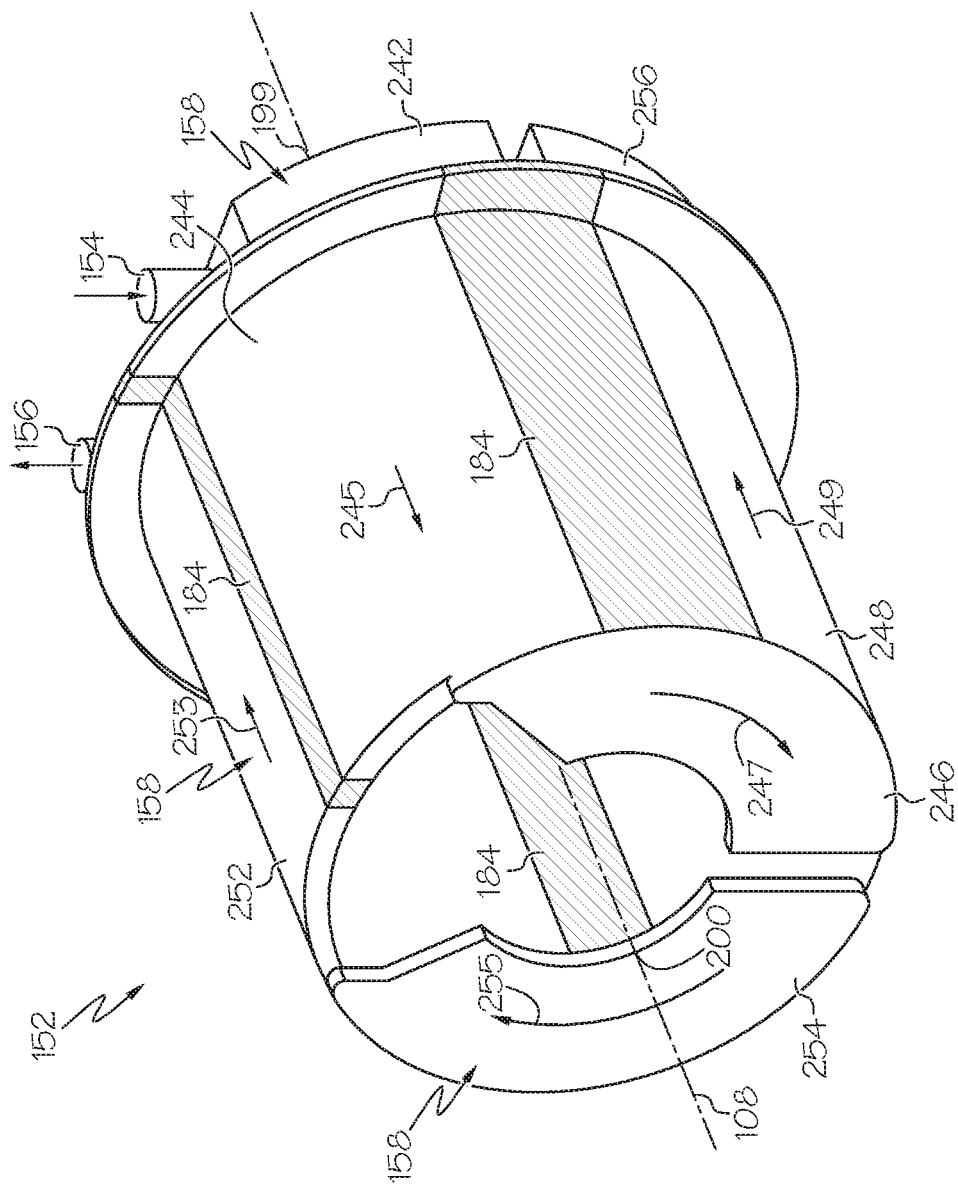
FIG. 7 is a rear perspective view of the coolant flow circuit through the e-charger of FIG. 1.

The plurality of passages 158 (FIGS. 5-7) may define a single, continuous fluid path from the inlet 154 to the outlet 156. The passages 158 and the fluid flow path through the cooling system 152 is illustrated in FIGS. 6 and 7. For purposes of clarity, only the voids defined between the outer housing 202 and the motor case 208 are shown in FIGS. 6 and 7. Some of the fluid boundaries 184 are indicated in FIGS. 6 and 7 with cross hatching for clarity to distinguish from the passages 158.

In some embodiments, the plurality of passages 158 may include at least one longitudinal passage, which extend generally along the axis 108 between the first end 199 and the second end 200. For example, there may be at least four such longitudinal passages. In the illustrated embodiments, for example, the e-charger 100 may include a first longitudinal passage 244, a second longitudinal passage 248, a third longitudinal passage 250, and a fourth longitudinal passage 252. At least one of these longitudinal passages may extend substantially parallel to the axis 108 and may direct the coolant in either a first direction along the axis (from the first end 199 to the second end 200) or in a second direction (from the second end 200 to the first end 199).

Also, the plurality of passages 158 may include at least one transverse passage, which extend transverse to the axis 108 (generally radially and/or arcuately about the axis). In some embodiments, the transverse passage(s) may provide flow in the radial and/or circumferential direction with respect to the axis 108. Also, the transverse passage may be disposed proximate the first end 199 or the second end 200. For example, the e-charger 100 may include a first end receiving passage 242 (a first transverse passage). As shown in the illustrated embodiments of FIGS. 6 and 7, the inlet 154 may be fluidly connected to the first receiving passage 242. Other transverse passages may be included, such as second end connecting passages 246, 254, a first end connecting passage 256, and a first end discharge passage 258.

The first end receiving passage 242 may be defined at the first end 199 between the end plate 210 and the first longitudinal end face 230 of the motor case 228. The projections 215*a*, 215*d* and bearing mount 213 of the end plate 210 may nest, respectively, against the projections 221*a*, 215*d*, 225 of the motor case 228 to cooperatively define a wall, dam, or other fluid boundary 184 for directing flow of the coolant. These opposing surfaces of the end plate 210 and the motor case 228 may be closely adjacent and, in some embodiments, may abut and/or seal together. However, this is not mandatory, and some amount of permitted leakage may occur across the nest surfaces while the boundary 184 contains a majority of the coolant within the passage 242.

As shown, the first end receiving passage 242 may be confined to a first quadrant of the e-charger 100 with respect to the axis 108 at the first end 199 of the e-charger 100. Flow into the first end receiving passage 242 may be received from the inlet 154 radially, and redirected transversely and arcuately about the axis 108, for example, to provide cooling to the bearing 214*a*. Flow from the first end receiving passage 242 may also be redirected toward the first longitudinal passage 244. This flow within and through the first end receiving passage 242 is illustrated generally by arrow 243 in FIG. 6.

The first longitudinal passage 244 may be defined between the outer diameter surface 232 of the motor case 228 and the inner diameter surface 166 of the outer body 203. More specifically, the passage 244 may be defined between the intermediate surface 170*a* and the outer diameter surface 232 as shown in FIG. 5. The first longitudinal passage 244 may be fluidly connected to the first end receiving passage 242 and may receive flow therefrom. The nest surface 169*a* may nest with the surface 232 of the motor case 228, and the nest surface 169*d* may nest with the surface 232 to define the respective fluid boundaries 184. As shown in FIG. 5, the first longitudinal passage 244 may be arcuate with respect to the axis 108. The first longitudinal passage 244 may extend arcuately within the first quadrant of the axis 108 (along with the first end receiving passage 242), and the first longitudinal passage 244 may pass longitudinally from the first end 199 to the second end 200 as indicated by arrow 245. The axis of the passage 244 may be parallel to the axis 108 in some embodiments. Coolant flow from the first end receiving passage 242 may be received and directed longitudinally along the axis 108 for cooling the motor 103.

Furthermore, as shown in FIG. 7, the cooling system 152 may include the second end connecting passage 246. The second end connecting passage 246 may be defined at the second end 200 between the end 164 and the second longitudinal end face 234 of the motor case 228. The first portion 238 and the second portion 240 of the projection 235 may nest against the inner surface 172 of the end 164 to define the second end connecting passage 246 for cooperatively defining a respective fluid boundary 184. As shown, the fluid boundaries 184 may define the second end connecting passage 246 across the first quadrant and circumferentially to a second quadrant with respect to the axis 108 at the second end 200 of the e-charger 100. Flow from the first longitudinal passage 244 may be received by the second end connecting passage 246 and may flow arcuately about the axis 108, for example, to provide cooling to the bearing 214*b*. Flow from the second end connecting passage 246 may also be redirected toward the second longitudinal passage 248 of the cooling system 152. This flow is illustrated generally by arrow 247 in FIG. 7.

The second longitudinal passage 248 may be defined between the outer diameter surface 232 of the motor case 228 and the inner diameter surface 166 of the outer body 203. More specifically, the passage 248 may be defined between the intermediate surface 170*d* and the outer diameter surface 232 as shown in FIG. 5. The second longitudinal passage 248 may be fluidly connected to the second end connecting passage 246 and may receive flow therefrom. The nest surface 169*d* may nest, abut, and substantially conform to the surface 232 of the motor case 228, and the nest surface 169*c* may nest, abut, and substantially conform to the surface 232 of the motor case 228 to define the respective fluid boundary 184. As shown in FIG. 5, the second longitudinal passage 248 may be arcuate with respect to the axis 108. The second longitudinal passage 248 may extend arcuately within the second quadrant of the axis 108 (along with the second end connecting passage 246), and the second longitudinal passage 248 may pass longitudinally from the second end 200 to the first end 199 as indicated by arrow 249. The axis of the passage 244 may be parallel to the axis 108 in some embodiments. Coolant flow from the second end connecting passage 246 may be received by the second longitudinal passage 248 and directed longitudinally along the axis 108 from the second end 200 toward the first end 199 for cooling the motor 103. Flow from the second longitudinal passage 248 may be received in the first end connecting passage 256 (FIG. 6).

The first end connecting passage 256 may be defined at the first end 199 between the end plate 210 and the first longitudinal end face 230 of the motor case 228. The projections 215b, 215d and bearing mount 213 of the end plate 210 may nest, respectively, against the projections 221b, 221d, 225 of the motor case 228 to cooperatively define the respective fluid boundary 184. Also, the projection 215c may be spaced apart from the projection 221c in the longitudinal direction to define a gap that allows passage of the fluid from the second quadrant to a third quadrant of the e-charger 100. This flow path is indicated by arrow 257 in FIG. 6. This flow may allow the coolant in the first end connecting passage 256 to remove heat from the bearing 214a and/or the motor 103. Flow from the first end connecting passage 256 may be received in the third longitudinal passage 250.

The third longitudinal passage 250 may be defined between the outer diameter surface 232 of the motor case 228 and the inner diameter surface 166 of the outer body 203. More specifically, the passage 250 may be defined between the intermediate surface 170c and the outer diameter surface 232 as shown in FIG. 5. The nest surface 169c may nest, abut, and/or substantially conform to the surface 232 of the motor case 228, and the nest surface 169b may nest, abut, and/or substantially conform to the surface 232 of the motor case 228 to define respective boundaries 184. As shown in FIG. 5, the third longitudinal passage 250 may be arcuate with respect to the axis 108. The third longitudinal passage 250 may extend arcuately within the third quadrant of the axis 108, and the third longitudinal passage 250 may pass longitudinally from the first end 199 to the second end 200 as indicated by arrow 251. The axis of the passage 250 may be parallel to the axis 108 in some embodiments. Coolant flow from the first end connecting passage 256 may be received by the third longitudinal passage 250 and directed longitudinally along the axis 108 from the first end 199 to the second end 200 for cooling the motor 103. Flow from the third longitudinal passage 250 may be received in the second end connecting passage 254 (FIG. 7).

The second end connecting passage 254 may be defined at the second end 200 between the end 164 and the second longitudinal end face 234 of the motor case 228. The first portion 238 and the second portion 240 of the projection 235 may nest against the inner surface 172 of the end 164 to define the second end connecting passage 246 for cooperatively defining the fluid boundary 184. As shown, the second end connecting passage 254 may be confined to the third quadrant and a fourth quadrant of the e-charger 100. Flow from the third longitudinal passage 250 may be received by the second end connecting passage 254 and may flow arcuately about the axis 108, for example, to provide cooling to the bearing 214b. Flow from the second end connecting passage 254 may also be redirected to the fourth longitudinal passage 252 of the cooling system 152. This flow is illustrated generally by arrow 253 in FIG. 7.

The fourth longitudinal passage 252 may be defined between the outer diameter surface 232 of the motor case 228 and the inner diameter surface 166 of the outer body 203. More specifically, the passage 252 may be defined between the intermediate surface 170b and the outer diameter surface 232 as shown in FIG. 5. The nest surface 169b may nest, abut, and/or substantially conform to the surface 232 of the motor case 228, and the nest surface 169a may nest, abut, and/or substantially conform to the surface 232 of the motor case 228 to define respective boundaries 184 of the fourth longitudinal passage 252. As shown in FIG. 5, the fourth longitudinal passage 252 may be arcuate with respect to the axis 108. The fourth longitudinal passage 252 may extend arcuately within the fourth quadrant of the axis 108, and the fourth longitudinal passage 252 may pass longitudinally from the second end 200 to the first end 199 as indicated by arrow 253. The axis of the passage 252 may be parallel to the axis 108 in some embodiments. Coolant flow from the second end connecting passage 254 may be received by the fourth longitudinal passage 252 and directed longitudinally along the axis 108 from the second end 200 to the first end 199 for cooling the motor 103. Flow from the fourth longitudinal passage 252 may be received in the first end discharge passage 258 (FIG. 6).

The first end discharge passage 258 may be defined at the first end 199 between the end plate 210 and the first longitudinal end face 230 of the motor case 228. The projections 215a, 215b and bearing mount 213 of the end plate 210 may nest, respectively, against the projections 221a, 215b, 225 of the motor case 228 to cooperatively define the respective fluid boundary 184 for directing flow of the coolant. As shown, the first end discharge passage 258 may be confined to the fourth quadrant of the e-charger 100 with respect to the axis 108 at the first end 199 of the e-charger 100. Flow from the fourth longitudinal passage 252 may be received by the first end discharge passage 258 and turned radially, and redirected transversely and arcuately about the axis 108, for example, to provide cooling to the bearing 214a. The first end discharge passage 258 may also be connected to the outlet 156. Thus, hot coolant may exit the e-charger 100 via the outlet 156 to be replaced by fresh (lower temperature) coolant entering via the inlet 154.

As mentioned above, the e-charger 100 may include a dampening system 300. The dampening system 300 may include one or more members that dissipate and dampen energy (e.g., vibrational energy) transferring through the housing 119 (e.g., through the motor housing 123). The dampening system 300 may be used to dampen loads originating at the compressor wheel 130. For example, the dampening system 300 may dampen radial and/or axial loads from the compressor wheel 130 due to unbalance of the rotating group 118. The dampening system 300 may also dampen thrust loads (axial loads) due to air pressure at the compressor wheel 130. Furthermore, the dampening system 300 may dampen loads generated from the motor 103. For example, the dampening system 300 may dampen radial and/or tangential electromagnetic loads due to electromagnetic unbalance (i.e., a torque ripple and/or phase imbalance) at the motor 103. The dampening system 300 may also dampen thermal loads as the motor 103 generates heat during operation of the e-charger 100. The dampening system 300 may also be effective in dampening vibration from an external source, such as an internal combustion engine or a turbocharger operatively coupled to the e-charger 100.

The dampening system 300 may include one or more members incorporated between the motor case 228 and the outer housing 202. Thus, even though the cooling system 152 includes passages that separate (i.e., space apart) the motor case 228 from the outer housing 202 at a distance, the dampening system 300 ameliorates vibration and/or other forces that would otherwise transfer between these components of the motor housing 123.

In some embodiments, the dampening system 300 may include a first solid state dampener (i.e., first dampener). This dampener may be referred to as a radial dampener 302 in some embodiments. The radial dampener 302 is shown in FIGS. 3, 4, 8, and 10 according to example embodiments.

The radial dampener 302 may be a continuous band that extends about the axis 108. The radial dampener 302 may include an outer radial surface 304 and an inner radial surface 306. The radial dampener 302 may have a thickness measured between these opposite radially-facing surfaces 304, 306, and this thickness may remain substantially continuous along the radial dampener 302 and about the axis 108.

The radial dampener 302 may be generally annular but may be wavy or otherwise uneven with peaks and troughs that are disposed in an alternating arrangement about the axis 108. The peaks and troughs may be disposed radially with respect the axis 108 such that the peaks and troughs are disposed at different radii (different radial distances relative to the axis 108). The radial dampener 302 may be resilient and flexible. The radial dampener 302 is illustrated in a neutral position in FIGS. 3 and 8 according to example embodiments, and the radial dampener 302 may resiliently flex away from this neutral position under the influence of a vibrational or other load. In some embodiments, the radial dampener 302 may be made from an elastomeric material, a resilient metal material, or otherwise. As shown in FIG. 8, the radial dampener 302 may extend about the bearing mount 213. Portions of the inner radial surface 306 (at the troughs) may abuttingly contact the outer diameter surface 264 of the bearing mount 213. Also, portions of the outer radial surface 304 (at the peaks) may abuttingly contact an inner diameter surface 212 of the end plate 210 at the central aperture 217.

During operation of the e-charger 100, the radial dampener 302 may resiliently deflect from the illustrated neutral position, for example, due to vibrations and/or other forces directed substantially in the radial direction (e.g., between the outer diameter surface 264 and the inner diameter surface 212 of the end plate 210). The loading may flex the radial dampener 302 in the radial and/or circumferential direction. The radial dampener 302 may flex slightly at one or more of the peaks and troughs. The radial dampener 302 may resiliently recover to the neutral shape (i.e., the dampener 302 may be biased toward the neutral position) to counterbalance and/or dampen the vibrations or other forces.

Furthermore, the dampening system 300 may include at least one second solid state dampener (i.e., second dampener). the second solid state dampener(s) may comprise a sealing dampener, which serves two or more purposes. Here, the second solid state dampener may seal the coolant, acting as a sealed fluid boundary, and the second solid state dampener may resiliently flex to dissipate vibrational or other loads. In some embodiments, there may be a plurality of such dual-purpose sealing dampeners. For example, as shown in FIG. 4, the dampening system 300 may include a first sealing dampener 310, a second sealing dampener 312, a third sealing dampener 314, and a fourth sealing dampener 316.

As represented in FIGS. 4 and 10, the first sealing dampener 310 may be continuous band (e.g., an O-ring) of elastomeric material that encircles the axis 108. The first sealing dampener 310 may be received within a groove 320 defined in the first longitudinal end face 230 of the motor case 228. As shown in FIG. 10, the first sealing dampener 310 may be sealed against the internal surface of the groove 320 (facing one longitudinal direction) and sealed against the second longitudinal side surface 268 of the bearing mount 213 (facing the opposite longitudinal direction). Thus, the first sealing dampener 310 may seal the coolant and prevent it from leaking radially inward toward the bearing 214a from between the bearing mount 213 and the motor case 228. Also, the first sealing dampener 310 may resiliently flex to dissipate vibration or other loads, such as loads directed substantially longitudinally between the bearing mount 213 and the motor case 228. During operation and during such resilient flexure, the first sealing dampener 310 may maintain at least some longitudinal clearance 322 between the bearing mount 213 and the end face 230 of the motor case 228.

Additionally, as represented in FIGS. 4, 8, and 10, the second sealing dampener 312 may be continuous band (e.g., an O-ring) of elastomeric material that encircles the axis 108. The second sealing dampener 312 may be received within a groove 324 defined in the first longitudinal side surface 230 of the bearing mount 213. As shown in FIG. 10, the second sealing dampener 312 may be sealed against the internal surface of the groove 320 (facing one longitudinal direction) and sealed against the opposing longitudinal surface of the end plate 210 (facing the opposite longitudinal direction). Thus, the second sealing dampener 312 may seal the coolant and prevent it from leaking radially inward toward the bearing 214a from between the bearing mount 213 and the end plate 210. Also, the second sealing dampener 312 may resiliently flex to dissipate vibration or other loads, such as loads directed substantially longitudinally between the bearing mount 213 and the end plate 210. During operation and during such resilient flexure, the second sealing dampener 312 may maintain at least some longitudinal clearance 326 between the bearing mount 213 and the end plate 210.

Figure 9:
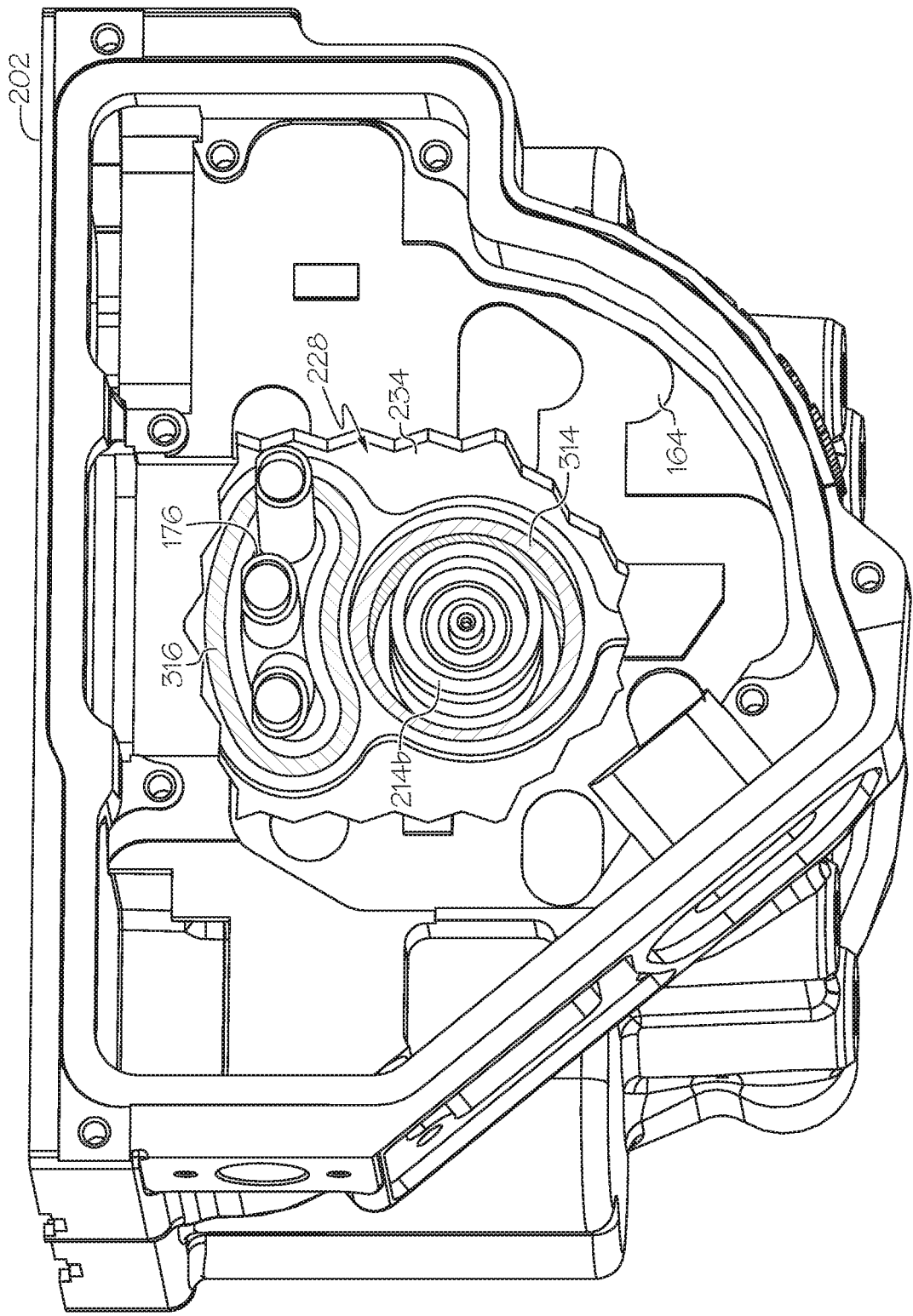
FIG. 9 is a rear perspective view of portions of the e-charger of FIG. 1.

As represented in FIGS. 4, 9, and 11, the third sealing dampener 314 may be a continuous band (e.g., an O-ring) of elastomeric material that encircles the axis 108. As shown in FIG. 11, the third sealing dampener 314 may be received within a groove 328 defined in the outer diameter surface of the bearing mount 178. The third sealing dampener 314 may be sealed against the internal surface of the groove 328 (facing one radial direction) and sealed against the opposing radial surface of the motor case 228 (facing the opposite radial direction). Thus, the third sealing dampener 314 may seal the coolant and prevent it from leaking longitudinally into the motor case 228 from between the bearing mount 178 and the motor case 228. Also, the third sealing dampener 314 may resiliently flex to dissipate vibration or other loads, such as loads directed substantially radially between the bearing mount 178 and the motor case 228. During operation and during such resilient flexure, the third sealing dampener 314 may maintain at least some radial clearance 330 between the bearing mount 178 and the motor case 228.

Moreover, as represented in FIGS. 4, 9, and 11, the fourth sealing dampener 316 may be a continuous band of elastomeric material that encircles the electrical connectors 176. As shown in FIG. 11, the fourth sealing dampener 316 may be received within a groove 332 defined in the longitudinal end face 234 of the motor case 228. The fourth sealing dampener 316 may be sealed against the internal surface of the groove 332 (facing one longitudinal direction) and sealed against the opposing inner surface 172 of the outer housing 202 (facing the opposite longitudinal direction). Thus, the fourth sealing dampener 316 may seal the coolant and prevent it from leaking out from between the motor case 228 and the outer housing 202 and onto the electrical connectors 176. Also, the fourth sealing dampener 316 may resiliently flex to dissipate vibration or other loads, such as loads directed substantially longitudinally between the outer housing 202 and the motor case 228. During operation and during such resilient flexure, the fourth sealing dampener 316 may maintain at least some longitudinal clearance 334 between the outer housing 202 and the motor case 228.

FIG. 12 illustrates the third sealing dampener 314' and the fourth sealing dampener 316' according to additional embodiments. As shown, the third and fourth sealing dampeners 314', 316' may be attached together via a connecting part 340'. Accordingly, the third sealing dampener 314', the second sealing dampener 316', and the connecting part 340' may collectively define a unitary part (i.e., a unitary sealing dampener). As shown, the third sealing dampener 314' may be a cylindrical, continuous band. The fourth sealing dampener 316' may also be a continuous band. The connecting part 340' and the fourth sealing dampener 316' may be fixed to the rim of the third sealing dampener 314' at one end such that the third sealing dampener 314' is centered about the axis 108' and the fourth sealing dampener 316' is spaced apart at a distance (radially) from the axis 108'.

As represented, the third sealing dampener 314' may be sealed to the end face 234' of the motor case 228' so as to encompass the connectors 176'. Like the embodiments discussed above, the third sealing dampener 314' may also seal to the opposing surface of the outer housing (not shown in FIG. 12). Additionally, the third sealing dampener 314' may resiliently deflect to dampen vibration or other loads (e.g., longitudinal loads).

Moreover, the fourth sealing dampener 316' may be sealed to the inner diameter surface of the motor case 228'. Like the embodiments discussed above, the fourth sealing dampener 316' may also seal to the opposing radial surface of the bearing mount (not shown in FIG. 12). Additionally, the fourth sealing dampener 316' may resiliently deflect to dampen vibration or other loads (e.g., radial loads).

It will be appreciated that the third and fourth sealing dampeners 314', 316' may provide manufacturing or other benefits because they are attached to define a unitary part. This is because the third and fourth dampeners 314', 316' may be formed in a single process (e.g., an injection molding process). The third and fourth dampeners 314', 316' may also be easier to handle and install as a unitary part as compared to embodiments in which they are separate parts.

Referring back to FIGS. 4-11, the dampening system 300 will be discussed further, although it will be appreciated that the embodiment of FIG. 12 may include these additional features. The dampening system 300 may include one or more fluid viscous dampeners that rely on hydrodynamics to provide dampening for the e-charger 100. Features of the cooling system 152 may define one or more of these fluid viscous dampeners.

For example, in some embodiments, the dampening system 300 may comprise one or more fluid viscous dampeners between opposing radial surfaces of the motor case 228 and the outer housing 202 so as to dampen vibration or other forces directed radially therebetween.

Specifically, as shown in FIG. 5, the dampening system 300 may include a first viscous dampener 350, a second viscous dampener 352, a third viscous dampener 354, and a fourth viscous dampener 356. The first viscous dampener 350 may include and/or may be defined by the nest surface 169a of the outer housing 202, the corresponding outer diameter surface 232 (corresponding nest surface) of the motor case 228, and the coolant disposed therebetween. The second viscous dampener 352 may include and/or may be defined by the nest surface 169b of the outer housing 202, the corresponding outer diameter surface 232 (corresponding nest surface) of the motor case 228, and the coolant disposed therebetween. The third viscous dampener 354 may include and/or may be defined by the nest surface 169c of the outer housing 202, the corresponding outer diameter surface 232 (corresponding nest surface) of the motor case 228, and the coolant disposed therebetween. The fourth viscous dampener 356 may include and/or may be defined by the nest surface 169d of the outer housing 202, the corresponding outer diameter surface 232 (corresponding nest surface) of the motor case 228, and the coolant disposed therebetween. As discussed above, these surfaces may define fluid boundaries 184 for the coolant system 152 because they are disposed relatively close together. As such, most coolant flow is directed longitudinally rather than circumferentially across the barriers 184. However, there may be some amount of coolant within the barriers 184, and the coolant may be pressurized throughout the coolant system 152 and including at the barriers 184 (i.e., at the viscous dampeners 350, 352, 354, 356). Accordingly, the coolant at these barriers 184 (i.e., at the dampeners 350, 352, 354, 356) may counteract and/or dissipate vibration and other forces directed radially between the motor case 228 and the outer housing 202.

Moreover, the e-charger 100 may include a biasing member 370 (FIG. 4). The biasing member 370 may be a helical or other spring with a first end 372 and a second end 374. The biasing member 370 may be disposed about the shaft 150 with the first end 372 mounted against the end 164 of the outer housing 202 and with the second end 374 mounted against the bearing 214b. The biasing member 370 may apply a preload to the bearing 214b directed longitudinally away from the second end 200 and toward the first end 199. In some embodiments, the preload from the biasing member 370 may counteract or compensate for differences in thermal expansion between the rotating group 118 and the housing 119.

The e-charger 100 may be highly manufacturable. The outer housing 202 may be formed via casting methods from aluminum in some embodiments. The motor case 228 may also be cast, for example, from aluminum. The stator 146 and rotor 148 may be formed to a predetermined shape, size, and configuration, and the motor 103 may be assembled within the motor case 228. Potting material may be used, and in some embodiments, the potting material may be conductive epoxy to maximize heat transfer through the motor 103 and motor case 228. Once assembled, the motor case 228 may be inserted into and enclosed within the outer housing 202 with the radial dampener 302 and the sealing dampeners 310, 312, 314, 316 included as discussed above. Then, the compressor section 111 may be installed and attached to the motor section 110. Subsequently, the e-charger 100 may be installed into the fuel cell system 102, for example, by attaching the electrical connectors 180 to the controller 134, by fluidly connecting the inlet 138 and the outlet 143 for airflow, and by fluidly connecting the inlet 154 and the outlet 156 for liquid coolant flow. The supplied coolant may be provided to the barriers 184 to provide the first, second, third, and fourth viscous dampeners 350, 352, 354, 356 as discussed above.

Accordingly, the hybrid dampening system 300 of the present disclosure provides effective dampening for the e-charger 100. The dampening system 300 may dampen vibration and/or other loads to improve robustness of the e-charger 100. Furthermore, the dampening system 300 may allow relatively simple roller-element bearings 214a, 214b to be incorporated in the e-charger 100 for added benefit. The e-charger 100 may operate at high efficiency in a wide variety of operating conditions as a result of the dampening system 300 of the present disclosure. The layout and construction of the dampening system 300 may be relatively simple and compact and, yet, may provide effective dampening for the e-charger 100. These features may also improve manufacturing efficiency and/or reduce manufacturing costs for the e-charger 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An e-charger comprising:
   a shaft supported for rotation about an axis;
   a compressor wheel that is attached to the shaft;
   an electric motor configured to drive the shaft and the compressor wheel in rotation;
   a housing that houses the electric motor and at least part of the shaft, the housing including a motor case that encases the electric motor and an outer housing that houses the motor case, the outer housing including an end plate and a bearing mount that is received by the end plate;
   a bearing that is attached to the bearing mount and the shaft, the bearing supporting rotation of the shaft relative to the bearing mount; and
   a dampening system incorporated in the housing and configured to dampen loads transferring through the housing, the dampening system including at least one solid-state dampener that is resiliently flexible, the dampening system including at least one fluid viscous dampener that includes a coolant fluid provided between the motor case and the outer housing; and
   the at least one solid-state dampener comprising a sealing dampener that is resiliently flexible, that seals against the motor case and the outer housing, and that defines a fluid boundary for the coolant fluid; and
   the at least one solid-state dampener further comprising a radial dampener, the radial dampener disposed radially between the bearing mount and the end plate, the radial dampener configured to resiliently flex to dampen loads transferring radially between the bearing mount and the end plate.

2. The e-charger of claim 1,
   wherein the outer housing includes a first member and a second member; and
   wherein the at least one solid-state dampener comprises a radial dampener that is radially disposed between the first member and the second member, the radial dampener configured to resiliently flex to dampen loads transferring radially between the first member and the second member.

3. The e-charger of claim 2, wherein the radial dampener has a neutral position and is configured to resiliently flex from the neutral position to dampen loads transferring radially between the first member and the second member; and
   wherein the radial dampener, in the neutral position, is at least partly wavy and includes a peak and a trough disposed at different radial distances from the axis.

4. The e-charger of claim 1, wherein the sealing dampener is disposed between and sealed to both the motor case and a first longitudinal side surface of the bearing mount.

5. The e-charger of claim 4, wherein the sealing dampener is a first sealing dampener, and wherein the at least one solid-state dampener comprises a second sealing dampener that is disposed between and sealed to both a second longitudinal side surface of the bearing mount and the end plate.

6. The e-charger of claim 1, wherein the at least one fluid viscous dampener is cooperatively defined between corresponding nest surfaces of the motor case and the outer housing, the corresponding nest surfaces nested together to define a fluid boundary, the fluid boundary separating two neighboring fluid passages for the coolant fluid.

7. The e-charger of claim 6, wherein the corresponding nest surfaces are elongate and extend along the axis.

8. The e-charger of claim 1, wherein the dampening system is configured to dampen loads transferring radially through the housing via the at least one solid-state dampener and the fluid viscous dampener; and
   wherein the dampening system is configured to dampen loads transferring longitudinally through the housing via the at least one solid-state dampener.

9. The e-charger of claim 8,
   wherein the sealing dampener is
      a first sealing dampener disposed radially between a second pair of opposing radial surfaces of the outer housing and the motor case; and
   wherein the at least one solid-state dampener further comprises a second sealing dampener disposed longitudinally between a third pair of opposing longitudinal surfaces of the outer housing and the motor case.

10. An e-charger comprising:
    a shaft supported for rotation about an axis;
    a compressor wheel that is attached to the shaft;
    an electric motor configured to drive the shaft and the compressor wheel in rotation;
    a housing that houses the electric motor and at least part of the shaft, the housing including a motor case that encases the electric motor and an outer housing that houses the motor case, wherein the outer housing includes a bearing mount with an inner diameter surface and an outer diameter surface;
    a bearing that is attached to the inner diameter surface of the bearing mount and the shaft, the bearing supporting rotation of the shaft relative to the bearing mount;
    a dampening system incorporated in the housing and configured to dampen loads transferring through the housing, the dampening system including at least one solid-state dampener that is resiliently flexible, the dampening system including at least one fluid viscous dampener that includes a coolant fluid provided between the motor case and the outer housing; and
    the at least one solid-state dampener comprising a sealing dampener that is resiliently flexible, that seals against the motor case and the outer housing, and that defines a fluid boundary for the coolant fluid; wherein the sealing dampener is disposed between and is sealed to the outer diameter surface of the bearing mount and the motor case.

11. The e-charger of claim 10, wherein the sealing dampener is a third sealing dampener;

wherein the at least one solid-state dampener includes a fourth sealing dampener disposed between and sealed to opposing longitudinal surfaces of the motor case and the outer housing.

12. The e-charger of claim 11, wherein the third sealing dampener is annular and extends about the axis;

wherein the fourth sealing dampener includes a continuous band that is spaced radially away from the axis; and wherein the third sealing dampener and the fourth sealing dampener are attached together to collectively define a unitary sealing dampener.

13. An e-charger comprising:

a shaft supported for rotation about an axis;

a compressor wheel that is attached to the shaft;

an electric motor configured to drive the shaft and the compressor wheel in rotation;

a motor case that encases the electric motor;

an outer housing that houses the motor case, the outer housing including a first member and a second member;

a cooling system including a coolant jacket defined between the outer housing and the motor case, the coolant jacket surrounding the motor case and provided on a first longitudinal end face, a second longitudinal end face, and an outer face of the motor case, the coolant jacket defining a plurality of coolant passages arranged along a flow path from an inlet to an outlet; and a dampening system including:

a solid-state radial dampener that is disposed radially between the first member and the second member of the outer housing and that is configured to resiliently flex to dampen radial loads transferred between the first and second members;

a first sealing dampener disposed longitudinally between and sealed to first opposing longitudinal surfaces of the motor case and the outer housing, the first sealing dampener providing a first fluid barrier for the coolant and configured to resiliently flex to dampen longitudinal loads transferred between the motor case and the outer housing;

a second sealing dampener disposed longitudinally between and sealed to second opposing longitudinal surfaces of the first member and the second member of the outer housing, the second sealing dampener providing a second fluid barrier for the coolant and configured to resiliently flex to dampen longitudinal loads transferred between the first member and the second member; and a plurality of viscous dampeners cooperatively defined by corresponding nesting surfaces of the motor case and the outer housing, the corresponding nesting surfaces separating different ones of the plurality of coolant passages, the corresponding nesting surfaces configured to receive an amount of the coolant therebetween to provide viscous dampening between the motor case and the outer housing.

14. The e-charger of claim 13, wherein the radial dampener has a neutral position and is configured to resiliently flex from the neutral position to dampen loads transferring radially between the first member and the second member; and wherein the radial dampener, in the neutral position, is at least partly wavy and includes a peak and a trough disposed at different radial distances from the axis.

15. The e-charger of claim 13, wherein the corresponding nest surfaces are elongate and extend along the axis.

16. The e-charger of claim 13, wherein the plurality of coolant passages are fluidly connected in-series from the inlet to the outlet.

17. The e-charger of claim 16, wherein the plurality of coolant passages are fluidly connected in-series to direct the coolant in a first direction longitudinally along the axis and in a second direction that is longitudinal and opposite the first direction.

18. The e-charger of claim 17, wherein the inlet and the outlet are disposed on a common longitudinal end of the coolant jacket.

19. The e-charger of claim 13, wherein the corresponding nesting surfaces include a concavely contoured surface of the outer housing and a corresponding convexly contoured surface of the motor case.

* * * * *